(12) United States Patent
Portisch et al.

(10) Patent No.: US 11,599,517 B2
(45) Date of Patent: Mar. 7, 2023

(54) GENERATION OF REALISTIC MOCK DATA

(71) Applicant: SAP SE, Walldorf (DE)

(72) Inventors: Jan Portisch, Bruchsal (DE); Volker Saggau, Bensheim (DE); Sandra Bracholdt, Dielheim (DE)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 16/920,260

(22) Filed: Jul. 2, 2020

(65) Prior Publication Data

US 2022/0004532 A1 Jan. 6, 2022

(51) Int. Cl.
*G06F 16/00* (2019.01)
*G06F 16/22* (2019.01)

(52) U.S. Cl.
CPC ...... *G06F 16/2282* (2019.01); *G06F 16/2272* (2019.01)

(58) Field of Classification Search
CPC .......................... G06F 16/2282; G06F 16/2272
USPC ........................................................ 707/696
See application file for complete search history.

(56) References Cited

U.S. PATENT DOCUMENTS 10,031,936 B2 * 7/2018 Bitar ..................... G06F 16/284
2015/0100946 A1 * 4/2015 Brunswig ........... G06F 11/3688
717/124

OTHER PUBLICATIONS

"Generating Test Data to a Database," PowerDesigner 16.5 SP5, 2015, 4 pages.
"Graph Database," Wikipedia, https://en.wikipedia.org/wiki/Graph_database, printed Jun. 12, 2020, 9 pages.
Rosie Hamilton, "Data Mocking—A way to test the untestable," Scott Logic Blog, Feb. 8, 2016, 2 pages.
"Mockaroo realistic data generator," mackaroo.com, Jun. 25, 2020, 2 pages.
"Populating Columns with Test Data," PowerDesigner 16.6 SP02, 1 page.
"PowerDesigner 16.0: Generating Test Data to a Database," infocenter.sybase.com, Jul. 21, 2011, 2 pages.
"Resource Description Framework," Wikipedia, https://en.wikipedia.org/wiki/Resource_Description_Framework, printed Jun. 12, 2020, 11 pages.

* cited by examiner

*Primary Examiner* — Chelcie L Daye
(74) *Attorney, Agent, or Firm* — Klarquist Sparkman, LLP

(57) ABSTRACT

A variety of scenarios for generating mock data based on original data are described. Characteristics of the original data can be reflected in the mock data without having access to the actual original data. Instead, statistical artifacts representing the original data can be used to instantiate reconstructed database tables. In relational database scenarios, foreign key relationships can be preserved even if the actual values are not known. The reconstructed database tables can be used as mock data in a variety of circumstances, including testing, and is especially useful to recreate characteristics of the original data when the original data cannot be made available for size, confidentiality, or privacy reasons.

20 Claims, 44 Drawing Sheets

Second Column

| | |
|---|---|
| 5 – 3 | 1 |
| 5 – 2 | 1 |
| 5 – 1 | 5 |
| 3 – 2 | 2 |
| 3 – 1 | 2 |
| 2 – 1 | 2 |

*Distinct fitting values (4)*: A, B, C, D

Select fitting rows
rows = pickRandomFittingRows(entry)

Column B:

FIG. 20

Second Column

Distinct fitting values (4): A, B, C, D

Select fitting rows:
rows = pickRandomFittingRows(entry)
Select fitting value:
value = pickRandomFittingValue(entry, rows)

Column B:

*Second Column*

*Column B:*

*Distinct fitting values (4):* A, B, ☒, D

*Select fitting rows:*
```
rows = pickRandomFittingRows(entry)
```
*Select fitting value:*
```
value = pickRandomFittingValue(entry, rows)
```
*Assign selected fitting value to fitting rows:*
```
appendColumnValueToGivenRowNtimes(rows, value)
```

FIG. 27

*Third Column*

| | |
|---|---|
| 5 – 3 – 2 | 1 |
| 5 – 3 – 1 | 1 |
| 5 – 2 – 1 | 2 |
| 5 – 1 – 1 | 5 |
| 3 – 2 – 1 | 4 |
| 3 – 1 – 1 | 2 |
| 2 – 1 – 1 | 2 |

*Distinct fitting values (7)*: O1, O2, O3, O4, O5, O6, O7

*Select fitting rows:*

```
rows = pickRandomFittingRows(entry)
```

*Select fitting value:*

```
value = pickRandomFittingValue(entry, rows)
```

*Assign selected fitting value to fitting rows:*

```
appendColumnValueToGivenRowNtimes(rows, value)
```

*Column C:*

| | | |
|---|---|---|
| II | C | O3 |
| II | C | O1 |
| II | D | O4 |
| II | A | O5 |
| II | B | O7 |
| V | B | O2 |
| V | B | O2 |
| V | B | O4 |
| V | D | O3 |
| V | A | O1 |
| III | B | O1 |
| III | B | O2 |
| III | C | O6 |
| I | D | O3 |
| I | D | O4 |
| I | C | O6 |
| IV | A | O1 |
| IV | B | O2 |

FIG. 40

GENERATION OF REALISTIC MOCK DATA

BACKGROUND

Software providers commonly develop software applications that deal with large amounts of data stored in databases, such as relational databases, graph databases, object-oriented databases, etc. While the software applications may have been rigorously verified and validated by the software providers using standard or proprietary test data, such test data may not be representative of realistic data collected by users of the software applications. Even if the test data is representative of the realistic data, users of the software application may handle the data in non-standard manners that deviate from standard data-handling procedures that have been tested during software development. As a result, users of the software applications may encounter technical problems when using the software applications to manage or process realistic data that are specific to the users' domain. To help diagnose and/or resolve the technical problems experienced by the users, software providers often need to replicate such problems. However, it may not be feasible for the software providers to access the user's data for a variety of reasons, e.g., the volume of the data is too large, the user's data are confidential, the user's data are protected by statutory privacy regulations, and so on. Thus, there remains a need for intelligent generation of realistic mock data that can accurately simulate the realistic data encountered by the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method. The method can include receiving statistical artefacts representing an original database table which has original values arranged in a plurality of rows and a plurality of columns, and instantiating a reconstructed database table based on the statistical artefacts. The reconstructed database table can include reconstructed values arranged in at least a subset of the plurality of columns of the original database table. The statistical artefacts can include first metrics characterizing distributions of row-based sequences of the original values and second metrics characterizing distributions of the first metrics. Distributions of row-based sequences of the reconstructed values in the reconstructed database table can be consistent with the first metrics, and meta-distributions of row-based sequences of the reconstructed values in the reconstructed database table can be consistent with the second metrics.

In some embodiments, at least some of the reconstructed values in the reconstructed database table can be different from the corresponding original values in the original database table.

In some embodiments, the original database table can include a first original database table that is related to at least a second original database table by a foreign key. The reconstructed database table can be a first reconstructed database table, and a second reconstructed database table can be reconstructed based on statistical artefacts representing the second original database table. A foreign key relationship between the first original database table and the second original database table can be preserved in the first reconstructed database table and the second reconstructed database table.

In some embodiments, the statistical artefacts can be calculated from a path tree constructed from row-value-paths associated with the original values in the original database table. The path tree can include a root and path-mark-nodes connected by edges. The path-mark-nodes can be arranged in a plurality of layers corresponding to the plurality of columns in the original database table. A path-mark-node in a layer can define a distinct row-value-path traversing from the root to the path-mark-node. An edge connecting two path-mark-nodes can include a path-count representing a count of row-value-paths traversing the two path-mark-nodes.

In some embodiments, the first metrics can include distinct path-count-sequences corresponding to the path-mark-nodes. A distinct path-count-sequence can include a unique sequence of path-counts of edges traversing from the root to the corresponding path-mark-node.

In some embodiments, the second metrics can include counts for distinct path-count-sequences.

In some embodiments, the statistical artefacts can further include distinct-value-counts of the original database table. A distinct-value-count can represent a count of distinct original values in a corresponding column of the original database table.

In some embodiments, instantiating the reconstructed database table can include generating distinct fitting values for the reconstructed database table. Counts of distinct fitting values for the plurality of columns of the reconstructed database table can equal the corresponding distinct-value-counts of the original database table.

In some embodiments, the original database table can be a first original database table and be related to at least a second original database table by a first foreign key. The reconstructed database table can be a first reconstructed database table and be related to at least a second reconstructed database table by a second foreign key corresponding to the first foreign key. The method can further include instantiating the second reconstructed database table based on statistical artefacts associated with the second original database table.

In some embodiments, the distinct fitting values associated with the foreign key generated for the first reconstructed database table can define a first distinct value set. Instantiating the second reconstructed database can include generating distinct fitting values for the second reconstructed database table. The distinct fitting values associated with the foreign key generated for the second reconstructed database can define a second distinct value set. The first distinct value set can be a subset of the second distinct value set if the second distinct value set has more members than the first distinct value set, and the second distinct value set can be a subset of the first distinct value set if the first distinct value set has more members than the second distinct value set.

In some embodiments, instantiating the reconstructed database table can include initiating empty cells arranged by the plurality of rows and the plurality of columns, and assigning the distinct fitting values to the empty cells.

In some embodiments, assigning the distinct fitting values to the empty cells can include identifying fitting rows. Identifying fitting rows can include randomly selecting rows of the reconstructed database table based on the distinct path-count-sequences.

In some embodiments, identifying fitting rows can further include comparing counts of empty cells in a column corresponding to the distinct path-count-sequences to the distinct-value-counts corresponding to the column.

In some embodiments, assigning the distinct fitting values to the empty cells can include randomly selecting the distinct fitting values corresponding to the fitting rows based on past record of assigning the distinct fitting values.

Certain embodiments of the disclosure also concern a system including a first computer and a second computer. The first computer can contain an original database table having original values arranged in a plurality of rows and a plurality of columns. The first computer can be configured to create statistical artefacts associated with the original database table. The second computer can be configured to receive the statistical artefacts from the first computer and instantiate a reconstructed database table based on the statistical artefacts. The reconstructed database table can include reconstructed values arranged in a subset of the plurality of columns of the original database table. At least some of the reconstructed values in the reconstructed database table can be different from the corresponding original values in the original database table. The original database table can be associated with a first path tree, the reconstructed database table can be associated with a second path tree, and the first path tree and the second path tree can share an identical tree topology.

In some embodiments, the first and second path trees associated the original and reconstructed database tables can respectively define row-value-paths associated with the original and reconstructed values in the original and reconstructed database tables. The first and second path trees can include respective root and path-mark-nodes connected by edges. The path-mark-nodes can be arranged in a plurality of layers corresponding to the plurality of columns. A path-mark-node in a layer can define a distinct row-value-path traversing from the respective root to the path-mark-node. An edge connecting two path-mark-nodes can include a path-count representing a count of row-value-paths traversing the two path-mark-nodes.

In some embodiments, the statistical artefacts can include distinct path-count-sequences corresponding to the path-mark-nodes and counts for distinct path-count-sequences. A distinct path-count-sequence can include a unique sequence of path-counts of edges traversing from the respective root to the corresponding path-mark-node.

In some embodiments, the statistical artefacts can further include distinct-value-counts of the original database table. A distinct-value-count can represent a count of distinct original values in a corresponding column of the original database table.

In some embodiments, the original database table can be a first original database table and be related to at least a second original database table by a first foreign key. The reconstructed database table can be a first reconstructed database table and be related to at least a second reconstructed database table by a second foreign key corresponding to the first foreign key. The second computer can be further configured to instantiate the second reconstructed database table based on statistical artefacts associated with the second original database table.

Certain embodiments of the disclosure further concern one or more computer-readable media having encoded thereon computer-executable instructions that cause one or more processors to perform a method. The method can include generating statistical artefacts associated with an original database table which include original values arranged in a plurality of rows and a plurality of columns, and instantiating a reconstructed database table based on the statistical artefacts. The reconstructed database table can include reconstructed values arranged in at least a subset of the plurality of columns of the original database table. At least some of the reconstructed values in the reconstructed database table can be different from the corresponding original values in the original database table. The original database table can be associated with a first path tree. The reconstructed database table can be associated with a second path tree. The first path tree and the second path tree can share an identical tree topology. The first and second path trees associated the original and reconstructed database tables can respectively define row-value-paths associated with the original and reconstructed values in the original and reconstructed database tables. The first and second path trees can include respective root and path-mark-nodes connected by edges. The path-mark-nodes can be arranged in a plurality of layers corresponding to the plurality of columns. A path-mark-node in a layer can define a distinct row-value-path traversing from the respective root to the path-mark-node. An edge connecting two path-mark-nodes can include a path-count representing a count of row-value-paths traversing the two path-mark-nodes.

The foregoing and other objects, features, and advantages will become more apparent from the following detailed description, which proceeds with reference to the accompanying figures.

BRIEF DESCRIPTION OF THE DRAWINGS

FIG. 20 is a diagram illustrating one example step of reconstructing the database table after the step depicted in FIG. 19.

FIG. 23 is a diagram illustrating one example step of reconstructing the database table after the step depicted in FIG. 22.

FIG. 24 is a diagram illustrating one example step of reconstructing the database table after the step depicted in FIG. 23.

FIG. 27 is a diagram illustrating one example step of reconstructing the database table after the step depicted in FIG. 26.

FIG. 40 is a diagram illustrating one example step of reconstructing the database table after the step depicted in FIG. 39.

DETAILED DESCRIPTION

Example 1—Overview of Realistic Data Testing in an Enterprise Resource Planning System Enterprise software generally maintains a database environment that can include a plurality of database tables. Users of enterprise software can run one or more queries against the database tables. Such queries can retrieve objects from the database tables that satisfy one or more conditions predefined in the queries.

Enterprise resource planning (ERP) systems allow an organization to use integrated software applications to manage and automate many back-office functions related to technology, services and human resources. ERP software typically integrates day-to-day processes of an enterprise and core capabilities in a single database, application and user interface.

Users of ERP software may encounter technical problems that require customer support from customer support provider (e.g., ERP software provider or other third party) for debugging and resolution. As is often the case in software, the root cause of such problems can sometimes be difficult to detect.

A starting point for debugging and resolution is to reproduce the problem using test data. However, the test data may not match the characteristics of the real data. Therefore, some technical problems such as poor performance or the like may not be reproducible using the test data because the problem stems from the distribution characteristics of the customer's data. And, because such data may not be available due to size limitations, sampling anomalies, confidentiality agreements, data privacy regulations, or the like, it becomes difficult or impossible to identify and solve the underlying technical problem.

Thus, it would be advantageous to be able to automatically and intelligently generate test or mock data that can realistically simulate the users' actual data, without actually obtaining such original data, thus avoiding the barriers described above. Further, it would be advantageous to generate high quality mock data with a high scalability such that it can adapt to varying needs of the users irrespective of data sources, data types, data sizes, and/or other factors.

Such intelligent and automatic mock data generation technologies can be applied across a wide variety of software environments. Although ERP systems are used as an example, the technologies described herein can be applied to database software scenarios in non-ERP systems. Specialized database systems, such as graph databases can also be supported.

Figure 1:
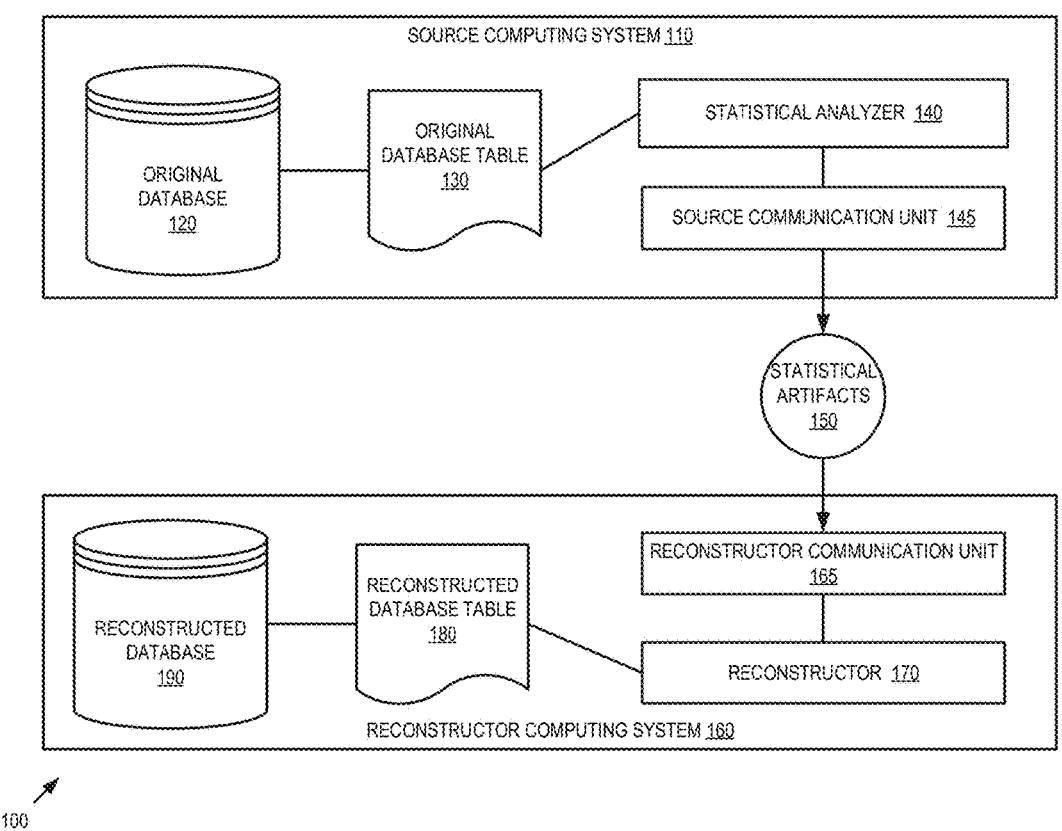
FIG. 1 is an overall block diagram of an example system for reconstructing database tables in a reconstructor computing system that preserve statistical properties of original database tables in a source computing system.

Example 2—Example Overview of the Overall System for Reconstructing Mock Data that Preserve Statistical Properties of Original Data FIG. 1 shows a block diagram of an example overall system 100 that implements the technologies described herein.

As shown, the overall system 100 can include a first computer system 110 and a second computer system 160. For example, the first computer system 110 can be a source computing system and the second computer system 160 can be a reconstructor computing system. The source computing system 110 can run a software application that can be installed in the first computer system 110 or in the cloud. The software application can process original database tables 130 of an original database 120. The original database 120 can be located at the first computer system 110, or alternatively, located elsewhere but is accessible by the first computer system 110. If a user of the source computing system 110 has experienced some technical problems when processing data in an original database table 130, the user can request technical support. To initiate the request, the user can activate a statistical analyzer 140, which can perform some statistical analysis of the original database table 130 and generate a plurality of statistical artefacts 150 as described more fully below. Through a source communication unit 145, the generated statistical artefacts 150 can be sent to the reconstructor computing system 160 for testing or debugging purposes. Thus, only the statistical artefacts 150 (which contain no confidential or sensitive user records or values and have a small size), not the original data contained in the original database table 130 (which may contain confidential or sensitive user records or values or have a large size), need to be transmitted to the reconstructor computing system 160.

Through a reconstructor communication unit 165, the reconstructor computing system 160 can receive the statistical artefacts 150 generated by the source computing system 110. The reconstructor computing system 160 can run a software application, which can activate a reconstructor 170 that instantiates a reconstructed database table 180 based on the received statistical artefacts 150. As described below, the reconstructed database table 180 can retain important statistical properties of the original database table 130. Further, foreign key relationships between the original database tables 130 can be preserved in the reconstructed database tables 180. In other words, the reconstructed database table 180 contains realistic mock data that accurately characterize the statistical profile of the original data contained in the original database table 130. Subsequently, the technical problems encountered by the user can be investigated by using the reconstructed database table 180 (e.g., reproducing the user's problem, running the same or a different application, debugging and analyzing the underlying reasons, and the like). The reconstructed database table 180 can be stored in a reconstructed database 190 for later database software development and testing purposes. The reconstructed database 190 can be located on the reconstructor computing system 160 or on the cloud.

In practice, the systems shown herein, such as systems 110 and 160 can vary in complexity, with additional functionality, more complex components, and the like. For example, there can be additional functionality within the source computing system 110 and/or the reconstructor computing system 160. Although the example shows a single table, in practice, one or more tables can be processed, including tables of a relational database having foreign key relationships, which can be preserved as described herein. Additional components can be included to implement security, redundancy, load balancing, report design, and the like.

Although FIG. 1 shows both source computing system 110 and reconstructor computing system 160, it should be understood that the reconstructor computing system 160 can be a standalone system without interaction with any source computing system 110. For example, based on prescribed statistical artefacts (e.g., user-defined or obtained from other sources), the reconstructor computing system 160 can generate a reconstructed database 190 containing realistic mock data. The reconstructor computing system 160 can then provide such realistic mock data for database software development, including verification and validation of the database software.

In other embodiments, the reconstructor computing system 160 can interface with more than one source computing system 110. For example, the reconstructor computing system 160 can communicate with a plurality of source computing systems 110, each of which can manage its own original database 120 containing source-specific data from a plurality of different source computing systems managed by different entities (e.g., different customers). For example, the data types, data attributes, data volume, and other data characteristics can vary among different industries, different countries, and so on. Despite such differences, the reconstructor computing system 160 can serve as a hub that responds to the need of different source computing systems 110 using the same technology described herein. In other words, the reconstructor computing system 160 can intelligently and automatically generate realistic mock data irrespective of the differences in source-specific data.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the software applications, the database tables, the statistical artefacts, the path tree, the data schema, and the like can be stored in one or more computer-readable storage media or computer-readable storage devices. The technologies described herein can be generic to the specifics of operating systems or hardware and can be applied in any variety of environments to take advantage of the described features.

Example 3—Example Overall Method of Generating Realistic Mock Data

Figure 2:
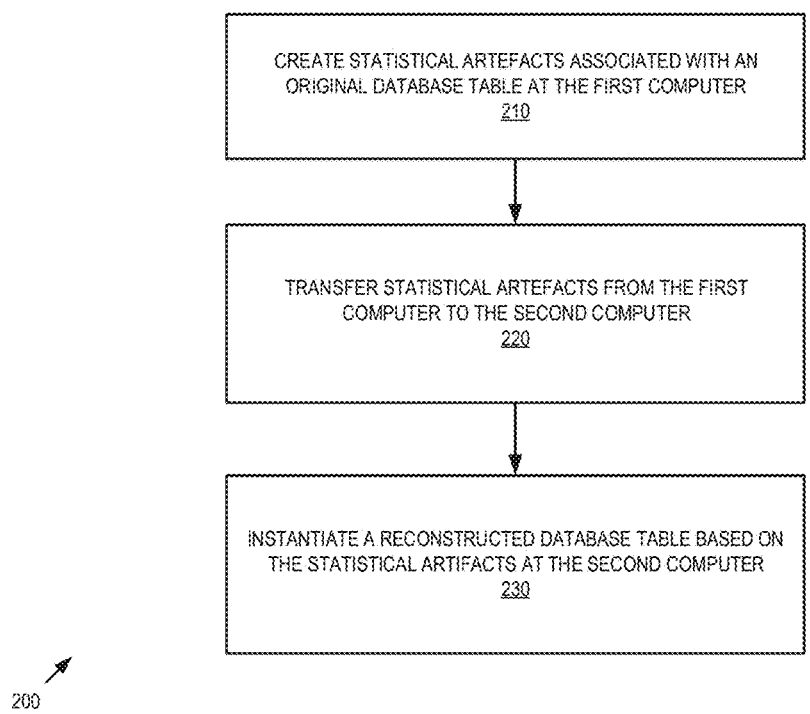
FIG. 2 is a flowchart illustrating an example overall method of reconstructing database tables in a reconstructor computing system that preserve statistical properties of original database tables in a source computing system.

FIG. 2 is a flowchart illustrating an example overall method 200 of implementing generation of realistic mock data and can be performed, for example, by the system of FIG. 1.

At 210, statistical artefacts associated with an original database table at a first computer (e.g., the source computing system) can be generated. Such statistical artefacts can represent the original database table and characteristics of the original database table. The statistical artefacts can be stored in a computer readable media, which can be transitory or non-transitory. According to one embodiment, the statistical artefacts can be saved in a computer file, which take a variety of formats (e.g., plain text, binary, HTML, etc.). At 220, the statistical artefacts can be sent from the first computer to a second computer (e.g., the reconstructor computing system). Then at 230, a reconstructed database table can be instantiated at the second computer based on the statistical artefacts. In some embodiments, steps 210-230 can be repeated so that a plurality of reconstructed database tables can be instantiated based on statistical artefacts respectively calculated from a corresponding plurality of original database tables. As noted above, the second computer can be a standalone system without interaction with the first computer system. In such scenario, the overall method 200 can include the reconstruction step 230 but exclude steps 210 and 220.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "sent" can also be described as "receive" from a different perspective.

Example 4—Computing System Functionality

In an of the examples herein, a source computing system can serve as a source from which the original data originates. The reconstructor computing system can receive statistical artefacts and instantiate mock data.

The instantiated mock data can be used for a variety of purposes, including testing and analysis, which can take place at the reconstructor computing system or another location (e.g., a test computing system).

In practice, boundaries among the systems can vary depending on the use case.

Example 5—Overview of Generating Realistic Data Retaining Statistical Properties of Original Data Although the example embodiments described below use relational database tables for illustration, it should be understood that the same principles disclosed herein can also be applied to other types of databases such as graph databases or other database types.

A relational database system can contain one or more database tables. The data or information for the database can be stored in these database tables. Database tables can be uniquely identified by their names. A database table can comprise values retained in a plurality of cells that are organized by a plurality of rows and a plurality of columns. Columns can comprise the column name, data type, and any other attributes for the column. Rows can comprise the records or data for the columns.

Figure 3:
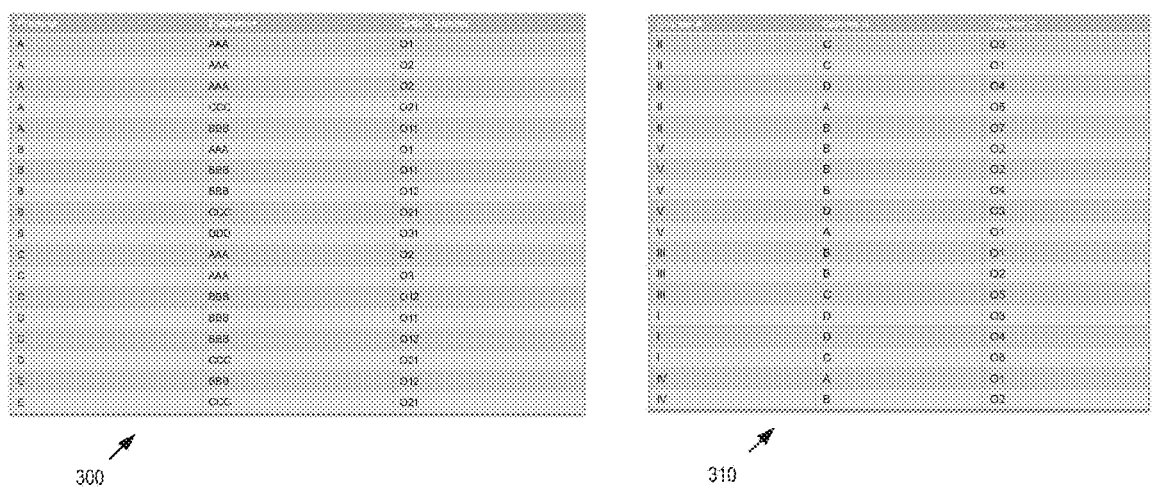
FIG. 3 is an example embodiment comparing an original database table and a reconstructed database table.

FIG. 3 shows two example database tables 300 and 310, each containing values that are arranged in 18 rows and 3 columns. As described in more detail below, table 300 can be an original database table containing original values and table 310 can be a reconstructed database table containing reconstructed values that retain important statistical properties of the original values. Thus, for testing purposes, the reconstructed values in the reconstructed database table 310 can be used as realistic mock data simulating the original values in the original database table 300.

In this example, despite the values contained in tables 300 and 310 are different (e.g., the first column values are A-E in table 300 but I-V in table 310), they share some common statistical properties.

For example, the counts of distinct values in three columns of table 300 are respectively: 5 ("Product": A, B, C, D, E), 4 ("Customer": AAA, BBB, CCC, DDD), and 7 ("Order Number": O1, O2, O3, O11, O12, O21, O31). The counts of distinct values in three columns of table 310 are the same, respectively: 5 ("Column A": I, II, III, IV, V), 4 ("Column B": A, B, C, D), and 7 ("Column C": O1, O2, O3, O4, O5, O6, O7).

In another example, the distribution of values in the "Product" column of table 300 is {5, 5, 3, 3, 2} for values {A, B, C, D, E}, respectively. The distribution of values in the "Column A" of table 310 is also {5, 5, 3, 3, 2} for values {II, V, I, III, IV}, respectively.

In a further example, each of the tables 300 and 310 can be represented by a corresponding path tree, and the two path trees corresponding to the two tables can have an identical tree topology, as described more fully below.

The examples are shown to illustrate features of the invention, but in practice the underlying data of tables can be stored in any of a variety of formats, including row-based formats, column-based formats, and the like. Compression can also be used to reduce the overall memory footprint of such tables.

Figure 4:
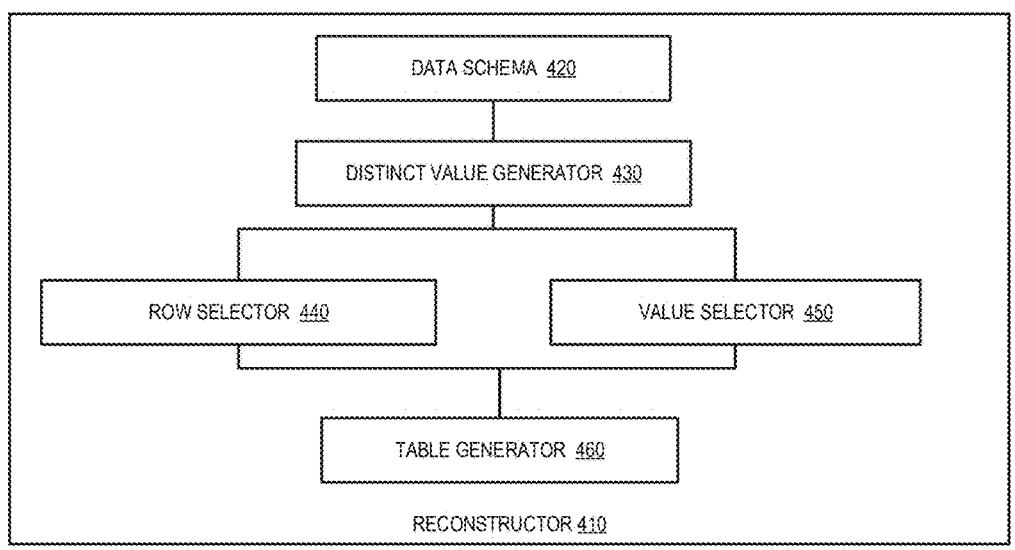
FIG. 4 is a block diagram of a reconstructor located in a reconstructor computing system, according to one embodiment.

Example 6—Example Overview System Components of Reconstructor for Instantiating Reconstructed Database Tables Based on Statistical Artifacts FIG. 4 is a block diagram 400 illustrating an example system components of a reconstructor 410 (such as the reconstructor 170 in FIG. 1) that can be included in a reconstructor computing system.

The reconstructor 410 can include a distinct value generator 430 configured to generate distinct values based on the statistical artefacts. The distinct value generator 430 can interact with a data schema 420, which can include definitions of various data types of the original values so that the distinct values generated by the distinct value generator 430 can have data types that are consistent with the corresponding original data values.

The reconstructor 410 can also include a row selector 440 configured to select which row(s) a distinct value should be assigned to, and a value selector 450 configured to select which distinct value should be assigned to the selected row(s). The reconstructor 410 can further include a table generator 460, which operates in conjunction with the row selector 440 and the value selector 450 for instantiating the reconstructed database table.

As described more fully below, the methods of generating distinct values, selecting rows, selecting distinct values, and instantiating the reconstructed database table are all based on statistical artefacts, which can be calculated from original database tables or prescribed.

Figure 5:
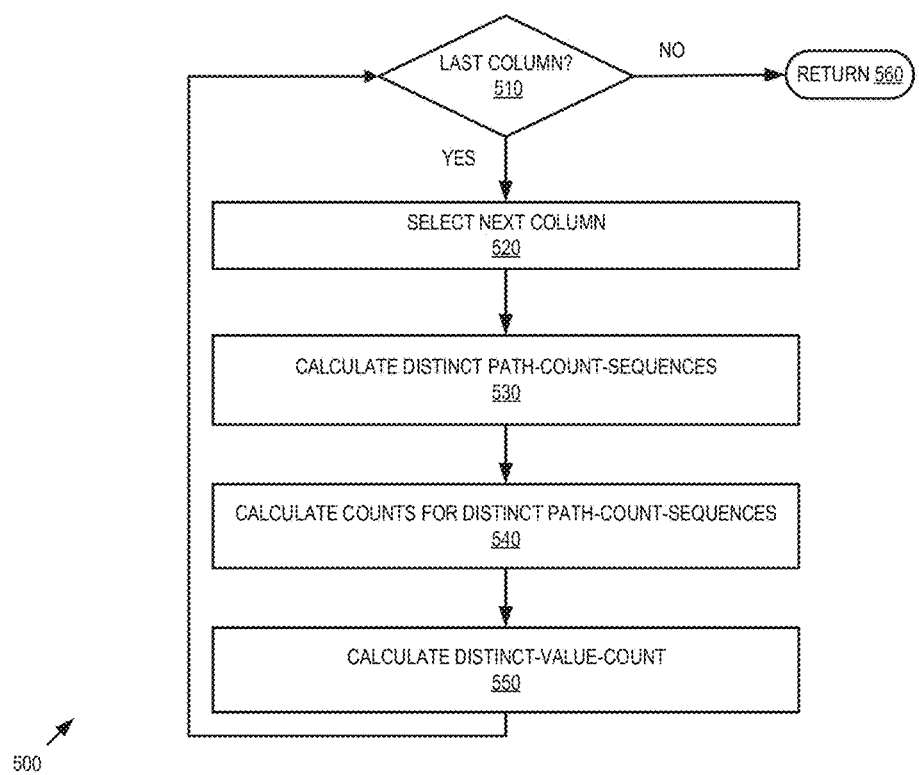
FIG. 5 is a flowchart illustrating an example method of generating statistical artefacts corresponding to an original database table in a source computing system.

Example 7—Example Overview Method for Calculating Statistical Artifacts Based on Original Database Table FIG. 5 a flowchart 500 illustrating an overall method for calculating statistical artefacts based on an original database table. The method described in the flowchart 500 can be repeated for a plurality of original database tables to generate respective statistical artefacts.

For an original database table, the corresponding statistical artefacts can be calculated column-wise (as noted below, in alternative embodiments, the statistical artifacts can be calculated row-wise by simply transposing the original database table). Thus, if the status check 510 finds that there is additional column(s) need to be processed, the method will continue to 520 by selecting the next column for calculation of the corresponding statistical artefacts.

As explained more fully below, the statistical artefacts can include distinct path-count-sequences ("first metrics") and counts for distinct path-count-sequences ("second metrics") for the columns. In some embodiments, the statistical artefacts can also include distinct-value-counts for the columns ("third metrics"). The distinct path-count-sequences can characterize distributions of the row-based sequences of the original values contained in the original database table. The counts for distinct path-count-sequences can characterize distributions of the distinct path-count-sequences.

At 530, the first metrics, e.g., distinct path-count-sequences corresponding to the selected column, can be calculated. At 540, the second metrics, e.g., counts for distinct path-count-sequences corresponding to the selected column, can be calculated. At 550, the third metrics, e.g., distinct-value-count for the selected column, can be calculated. In some embodiments, step 550 can be optional. The method can then return to the status check 510. If the last column has been processed, the calculation of the statistical artefacts for the corresponding database table ends at 560.

Figure 6:
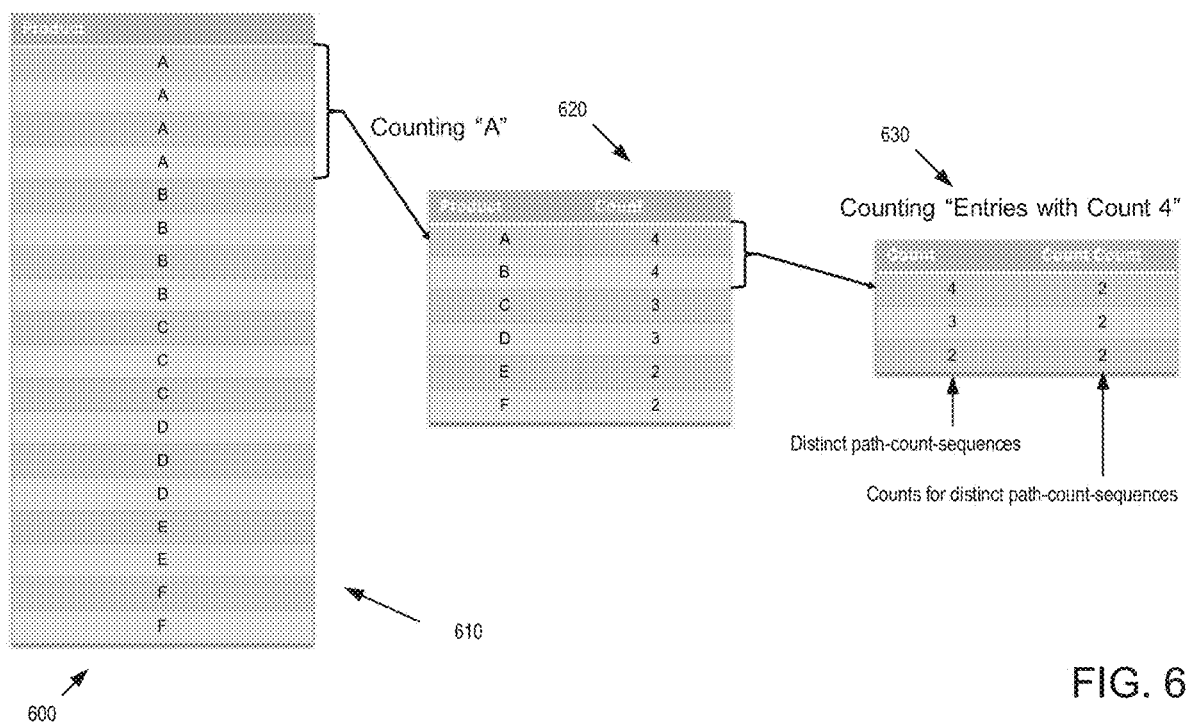
FIG. 6 is a diagram illustrating an example embodiment of calculating statistical artefacts for a one-column database table.

Example 8—Example Embodiment of Calculating Distinct Path-Count-Sequences and Counts for Distinct Path-Count-Sequences in a One-Column Database Table FIG. 6 shows an example embodiment illustrating the concept of calculating distinct path-count-sequences and counts for distinct path-count-sequences in a one-column database table 610.

For the one-column database table 610, each path-count-sequence contains only one count, which is the count of one distinct value in the column ("Product"). For example, the distinct value A occurs 4 times in the column, and the path-count-sequence corresponding to value A is represented as a single count 4. Similarly, the path-count-sequences corresponding to values B, C, D, E, and F are represented as 4, 3, 3, 2, and 3, respectively, as listed in table 620.

The distinct path-count-sequences are unique path-count-sequences. In this example, there are three distinct path-count-sequences: 4, 3, and 2, as listed in the first column of table 630. The counts for distinct path-count-sequences simply count the number for corresponding distinct path-count-sequences. For example, the count for distinct path-count-sequence 4 is 2, the count for distinct path-count-sequence 3 is 2, and the count for distinct path-count-sequence 2 is also 2, as listed in the second column of table 630. Notably, table 620 shows a distribution of values in the column, and table 630 shows a distribution of distribution of values in the column. As described herein, a distribution of distribution is also sometimes called a "meta-distribution" herein.

Example 9—Example Embodiment of Constructing a Path Tree Corresponding to a Database Table When a database table comprises more than one column's data, path-count-sequences and counts for distinct path-count-sequences can be calculated from a path tree as described herein.

Figure 7:
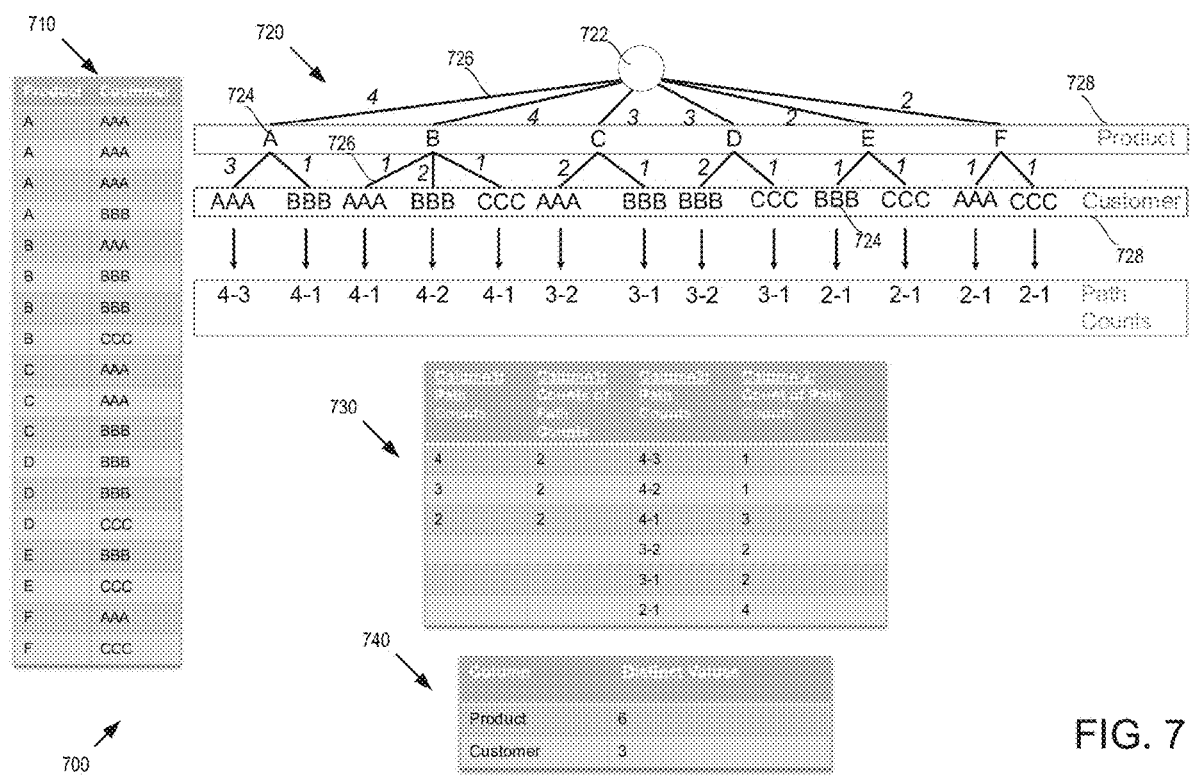
FIG. 7 is a diagram illustrating an example embodiment of constructing a path tree and calculating associated statistical artefacts for a one-column database table.

FIG. 7 shows an example embodiment illustrating the method of creating a path tree 720 based on a two-column database table 710.

Specifically, a path tree can be constructed from row-value-paths associated with the values contained in a database table. Each value in the database table can be represented by a corresponding row-value path. For example, for the second column ("Customer") of table 710, the value in the first row ("AAA") has a row-value path "A-AAA" which denotes a sequence of values starting from the first column and ending at the second column. Similarly, the values in the next two rows ("AAA") have the identical row-value-path "A-AAA." The value in the 4-th row ("BBB") has a different row-value-path "A-BBB," the value in the 5-th row ("AAA") has another row-value-path "B-AAA," and so on. In general, for a value contained in a cell located at the i-th row and j-th column of a database table (where i and j are integers), the row-value-path for the value can be represented by a sequence of values in the i-th row, starting from the first column and ending at the j-th column.

The row-value-paths corresponding to values contained in a database table can be mapped to a path tree comprising a plurality of nodes connected by edges. For example, the path tree 720 includes a plurality of path-mark-nodes 724 connected by edges 726. The path-mark-nodes 724 can be arranged in a plurality of layers 728 (2 layers in this example) corresponding to the plurality of columns ("Product" and "Customer" in this example) in the database table. The path tree 720 also includes a root 722 which is an artificially created node connected to the path-mark-nodes 724 of the first layer ("Product" in this example).

As described herein, a path-mark-node 724 in a layer marks a distinct row-value-path traversing from the root 722 to the path-mark-node 724. For example, the path-mark-nodes 724 in the first layer (A, B, C, D, E, and F) respectively represent the row-value-paths of "A," "B," "C," "D," "E," and "F." Similarly, the path-mark-nodes 724 in the second layer (AAA, BBB, AAA, BBB, CCC, AAA, BBB, BBB, CCC, BBB, CCC, AAA, and CCC) respectively represent the following row-value-paths: "A-AAA," "A-BBB," "B-AAA," "B-BBB," "B-CCC," "C-AAA," "C-BBB," "D-BBB," "D-CCC," "E-BBB," "E-CCC," "F-AAA," and "F-CCC."

Clearly, each value in the database table 710 can be mapped to a unique path-mark node 724 in the path tree 720. On the other hand, a path-mark-node 724 in the path tree 720 may correspond to one or more than one values in the database table 710.

As described herein, an edge 726 connecting two path-mark-nodes 724 can comprise a path-count representing a count of row-value-paths traversing the two path-mark-nodes 724. For example, the path count associated with the edge connecting between A and AAA is 3, indicating there are three row-value-paths traversing between these two path-mark-nodes (i.e., "A-AAA" for the first three rows in table 710). In another example, the path count associated with the edge connecting between A and BBB is 1, indicating there is only one row-value-path traversing between these two path-mark-nodes (i.e., "A-BBB" for the 4-th row in table 710).

Example 10—Example Embodiment of Obtaining Distinct Path-Count-Sequences, Counts for Distinct Path-Count-Sequences, and Distinct-Value-Count in a Two-Column Database Table FIG. 7 also illustrates the concept of obtaining distinct path-count-sequences and counts for distinct path-count-sequences in a multi-column database table. As shorthand, in this figure and some of the following figures, the distinct path-count-sequences are also noted "Path Counts," and the counts for distinct path-count-sequences are also noted as "Count of Path Counts."

As described herein, the path-mark-nodes in a path tree can be associated with corresponding path-count-sequences, and a path-count-sequence can comprise a sequence of path-counts of edges traversing from the root to the corresponding path-mark-node. As noted above, the distinct path-count-sequences are unique path-count-sequences. The counts for distinct path-count-sequences simply count the number for corresponding distinct path-count-sequences.

For example, for the path tree 720, each of the path-mark-nodes in the first layer (A, B, C, D, E, and F) has only one edge connected to the root 722, and the corresponding path-count-sequences are 4, 4, 3, 3, 2, and 2. Thus, for this first layer, there are three distinctive path-count-sequences: 4, 3, and 2, as listed in the first column of table 730. The counts for distinctive path-count-sequences are 2, 2, and 2, as listed in the second column of table 730.

For the second layer, each path-mark-node is connected to the root 722 by two edges. The corresponding (starting from the root) for the path-mark-nodes in the second layer are respectively: 4-3, 4-1, 4-1, 4-2, 4-1, 3-2, 3-1, 3-2, 3-1, 2-1, 2-1, 2-1, and 2-1. Thus, for this layer, there are 6 distinct path-count-sequences: 4-3, 4-2, 4-1, 3-2, 3-1, and 2-1, as listed in the third column of table 730. The counts for distinctive path-count-sequences are 1, 1, 3, 2, 2, and 4, respectively, as listed in the fourth column of table 730.

Notably, the distinct path-count-sequences can characterize the distributions of row-based sequences (e.g., path-count-sequences) of the values in a database table, and counts for distinctive path-count-sequences can characterize the distribution of distribution (i.e., meta-distribution) of row-based sequences of the values in the database table.

In addition, the distinct-value-counts corresponding to the two columns of table 710 can be calculated, as listed in table 740. For example, the distinct-value-count for the first column "Product" is 6 (i.e., A-F), and the distinct-value-count for the second column "Customer" is 3 (i.e., AAA, BBB, CCC).

For illustration purposes, the table below shows the pseudocode implementing the function of generating statistical artefacts associated with a plurality of database tables.

```
# tables is the set of tables of the system
table_tree = NEW Map<Table, Tree>
FOR table IN tables:
    tree = NEW Tree( ) # one tree per table
    FOR row IN table.rows:
        level = 0
        FOR column_value IN row.values:
            IF tree.level(0).has(column_value)
                tree.level(0).get(column_value.count) += 1
            ELSE
                tree.level(0).put(column_value)
                tree.level(0).get(column_value.count) += 1
            END IF
        END FOR
    END FOR
    table_tree.put(table, tree)
END FOR
table_pathcount = NEW Map<table, Map<PathCount, Count>>
FOR table, tree IN table_tree:
    Map<PathCount, Count> pathcount =
        tree.getDistinctPathCountsWithCount( )
    table_pathcount.add(table, pathcount)
END FOR
# generate distinct-value-counts
result = NEW Map<Column, Integer>
FOR column IN table:
    result.put(column, getDistinctValues(column))
END FOR
```

Figure 8:
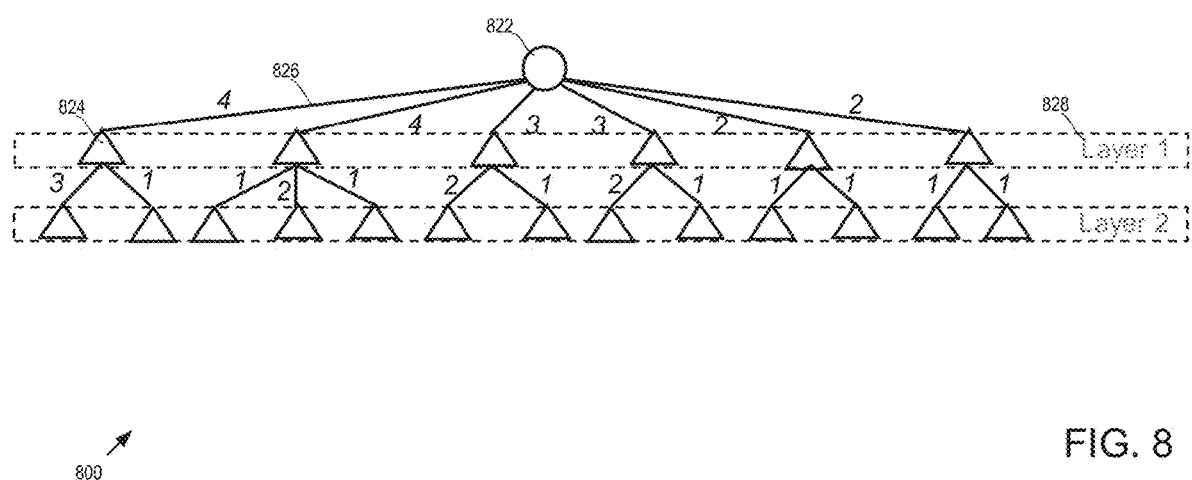
FIG. 8 is a diagram illustrating a tree topology corresponding to the path tree depicted in FIG. 7.

FIG. 8 shows a tree topology 800 corresponding to the path tree 720 depicted in FIG. 7. The tree topology 800 retains the overall node-edge structure of the path tree without showing the values or expressions of the path-mark-nodes. For example, the tree topology 800 comprises a root 822 (corresponding to the root 722), a plurality of path-mark-nodes 824 shown as triangles (corresponding to the path-mark-nodes 724) and arranged in layers 828 (corresponding to the layers 728), and the connecting edges 826 retaining the corresponding edge-counts (corresponding to the edges 726). In other words, the tree topology 800 is topologically identical to the path tree 720.

The statistical artefacts calculated above, such as the distinct path-count-sequences, the counts for distinct path-count-sequences, and the distinct-value-counts, can be transmitted to the reconstructor computing system for later instantiation of the reconstructed database table.

It should be noted that some of the statistical artefacts calculated above may contain redundant information. For example, the distinct path-count-sequences and the counts for distinct path-count-sequences corresponding to the first column may be derived automatically from the distinct path-count-sequences and the counts for distinct path-count-sequences corresponding to the second column. Thus, it is possible to transmit only a portion of the generated statistical artefacts to the reconstructor computing system for instantiation of the reconstructed database table. However, since the size of the generated statistical artefacts can be negligible compared to the size of the original database table (which may include data arranged in thousands of rows and/or columns), the complete set of statistical artefacts can be transmitted to the reconstructor computing system without incurring a significant burden on the communication channel.

As described more fully below, the path tree of the reconstructed database table can share the same tree topology as the path tree of the original database table. Thus, statistical artefacts derived from the original values in the original database table can be preserved in the reconstructed values in the reconstructed database table.

Figure 9:
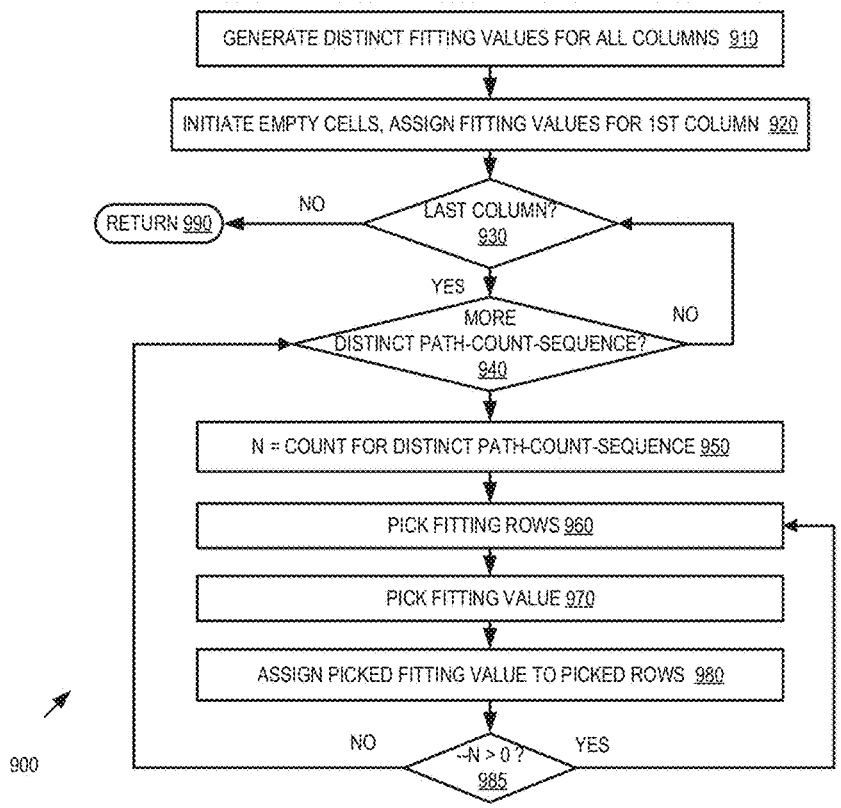
FIG. 9 is a flowchart illustrating an example method of reconstructing a database table based on received statistical artefacts in a reconstructor computing system.

Example 11—Example Overall Method of Reconstructing a Database Table Based on Statistical Artifacts Calculated from an Original Database Table FIG. 9 is a flowchart 900 showing an overall method of reconstructing a database table based on statistical artefacts calculated from an original database table. The method can be implemented by a reconstructor such as 410 or 170 described above.

At 910, the method can generate distinct fitting values for columns of the reconstructed database table, for example, based on the distinct-value-counts contained in the received statistical artefacts.

As explained below, because the statistical artefacts include data characterizing the path tree associated with the original database table, the reconstructor can deduce the number of rows and number of columns contained in the original database table. Thus, at 920, the method can initiate the reconstructed database table by creating empty cells arranged by the plurality of rows and the plurality of columns corresponding to the original database table. The method can further assign distinct fitting values corresponding to the first column to the first column of the reconstructed database table.

The reconstructed database table can be instantiated column-wise until the reconstructed database table has the same number of columns as the original database table. Thus, if the status check 930 finds that the last column has been instantiated, the instantiation of the database table ends at 990. Otherwise, the method continues to 940.

At 940, the method performs another check if there is any additional distinct past-count-sequence has not been processed. If all distinct path-count-sequences corresponding to the current column has been processed, it means the current column has been fully instantiated, and the method can return to step 930. Otherwise, the method can proceed to step 950 to process the next distinct path-count-sequence.

At 950, the method initializes a counter (e.g., N) to equal the count for to the to-be-processed distinct-count-sequence. At 960, the method can pick fitting rows based on the distinct path-count-sequence. At 970, the method can further pick a fitting value from the distinct fitting values generated at step 910. Then at 980, the picked fitting value can be assigned to the picked fitting rows.

At 985, the method can decrement the counter and then compare the counter with zero. If the counter is greater than 0, the it means the same distinct-count-sequence needs to be continuously processed, and the method can return to step 960. Otherwise, it means the present distinct-count-sequence has been fully processed, and the method can return to step 940.

For illustration purposes, the table below shows the pseudocode implementing the function of instantiating a reconstructed database table based on received statistical artefacts associated with an original database table.

```
# column_1 is the first column
values = NEW Map<Column, Set<Values>>
values = generateValues(table)
FOR entry IN column_1_counts:
    value = drawWithoutReplacement(values.get(column_1))
    DO entry.count TIMES:
        write(column_1, value)
currentColumn = 0
DO table.getColumns.size( ) − 1 TIMES: # −1 because first column is done
    currentColumn++
```

```
FOR entry IN path_counts:
    rows = pickRandomFittingRows(entry) # see following examples
    value = pickRandomFittingValue(entry, rows) # see following examples
    appendColumnValueToGivenRowNtimes(rows, value)
...
...
```

Further illustration of the method shown in the flowchart 900 and the pseudocode listed above is provided in additional examples discussed below.

Example 12—Example Method of Generating Distinct Fitting Values

In one embodiment, the reconstructor can generate a plurality of distinct fitting values based on the distinct-value-counts contained in the received statistical artefacts.

Figure 10:
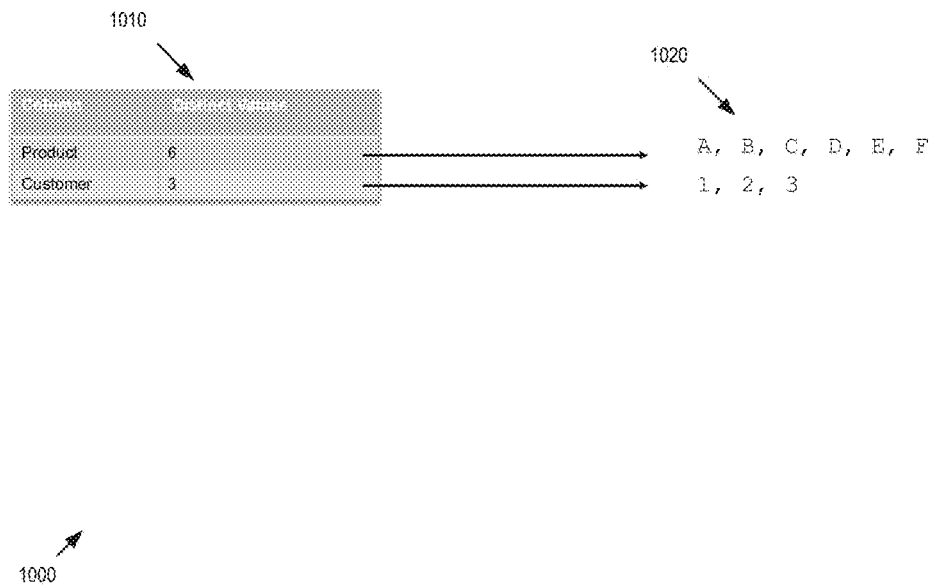
FIG. 10 is a diagram illustrating one example step of generating distinct values for reconstructing the two-column database table depicted in FIG. 7.

FIG. 10 shows one example embodiment of generating distinct fitting values based on the distinct-value-counts generated based on the table 710 shown in FIG. 7. As shown, corresponding to the "Product" column of table 710 which has a distinct-value-count of 6, the reconstructor can generate 6 distinct fitting values: A, B, C, D, E, and F. Likewise, corresponding to the "Customer" column of table 710 which has a distinct-value-count of 3, the reconstructor can generate 3 distinct fitting values: 1, 2, and 3.

The distinct fitting values generated by the reconstructor (i.e., A-F and 1-3) can be used to instantiate the reconstructed database table. Note that although the generated distinct fitting values may be the same as the original values (e.g., A-F for both the original and generated values), they can also be different (e.g., the generated distinct fitting values 1, 2, and 3 are different from the original values AAA, BBB, and CCC). Thus, the reconstructed database table can contain different values than the original database table. But as described below, the reconstructed database table preserves important statistical properties of the original database table.

There are a variety of approaches to generate distinct fitting values based on the distinct-value-counts. In an example embodiment, the distinct fitting values can be randomly (or sequentially, or through a predefined selection processes) generated according to an underlying data model that defines data types and/or semantic specifications of the values. For example, the data model can specify that the distinct fitting values generated for a specific volume have the data type of integer, string, date, or others. In another example, the data model can specify that the certain generated distinct fitting values must satisfy some attribute and/or semantic specifications, such as the constraints of the strings (e.g., length, sequence, etc.), the dictionary from which the distinct fitting values can be drawn from, the language of the domains, etc. Thus, the distinct fitting values generated according to the data model can simulate original values at least in terms of data types, attributes, and semantics.

In some embodiments, the reconstructor computing system can retain a predefined data model that contains definitions of the data types and/or semantic specifications of the original values in the original database table. This may occur when a source computing system's database table is created based on specifications provided by the database software developer (and having been tested) such that the original values in the source computing system's database table follow a schema that is known to the reconstructor computing system. In some other embodiments, the reconstructor computing system does not retain a predefined data model. Instead, the source computing system can transmit to the reconstructor computing system a data model that defines data types and/or semantic specifications of the original values in the original database table. Such data model can be usually defined in a small configuration file and does not contain confidential user's data, thus it can be easily transmitted from the source computing system to the reconstructor computing system. In some embodiments, the reconstructor computing system can retain the data model (either predefined or transmitted from the source computing system) in a data schema which can be accessed by the reconstructor, as illustrated in FIG. 4.

Example 13—Example Method of Sharing Distinct Fitting Values Among Database Tables Related by Foreign Keys In a relational database, two database tables can be linked together by a foreign key, which is a field (or collection of fields) in one database table that refers to a primary key in another database table. In any of the exampled described here, the disclosed technology can retain foreign key relationships between original database tables in the reconstructed database tables. Thus, operations on the reconstructed database tables (e.g., JOIN, INTERSECT, etc.) can realistically simulate corresponding operations on the original database tables.

Figure 11:
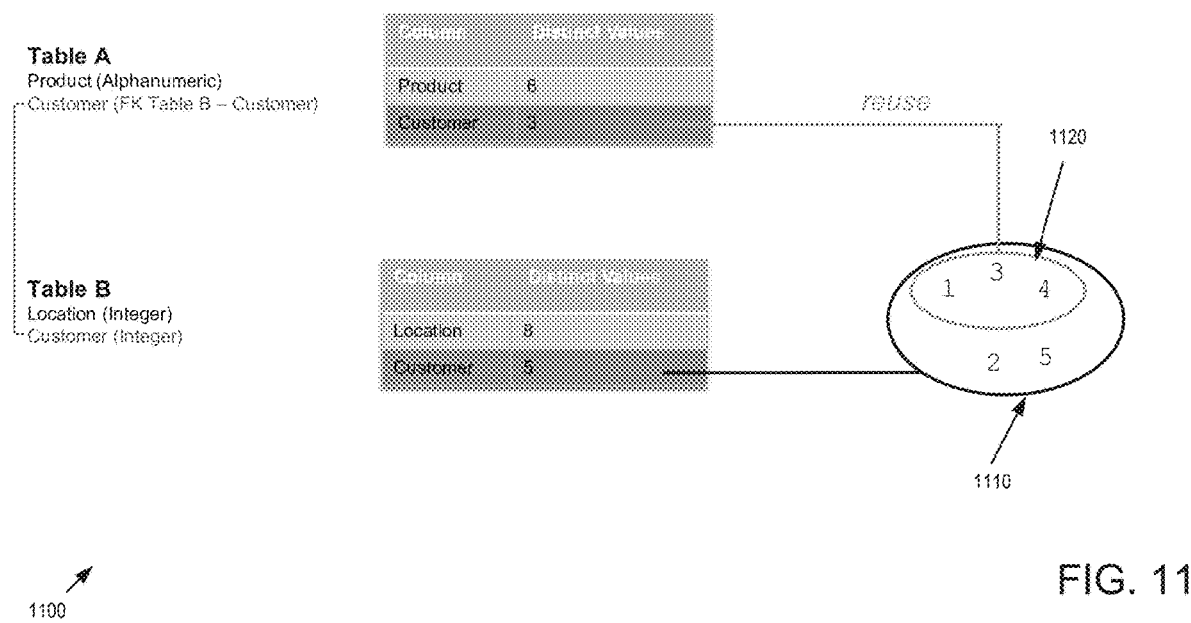
FIG. 11 is a diagram illustrating one example embodiment of sharing distinct values across database tables that are related by foreign keys.

FIG. 11 shows a diagram 1100 illustrating an example embodiment of generating distinct fitting values that are shared between reconstructed database tables linked by a foreign key.

In the depicted example, table A has two columns: Product and Customer. The distinct-value-counts associated with the two columns of table A are respectively 6 and 3. Table B also has two columns: Location and Customer. The distinct-value-counts associated with the two columns of table B are respectively 8 and 5. Noted that the "Customer" column in table A is linked to the "Customer" column in table B through a foreign key.

According to one embodiment, for foreign key relations, the generation of distinct values by the reconstructor only occurs for the related columns that are associated with the most distinct-value-counts. In the depicted example, the distinct-value count associated with "Customer" column in table B (i.e., 5) is larger than the distinct-value count associated with "Customer" column in table A (i.e., 3). Thus, for the related "Customer" columns, the reconstructor only needs to generate one data set 1110 containing 5 distinct fitting values (e.g., 1, 2, 3, 4, and 5) based on the "Customer" column in table B. A subset 1120 (e.g., 1, 3, and 4) of the generated distinct fitting values can then be reused as distinct fitting values generated for the "Customer" column in table A. Because the subset 1120 of distinct fitting values (e.g., 1, 3, and 4) are shared by both "Customer" columns in table A and table B, the foreign key relationship between the original tables A and B can be preserved in the reconstructed database tables.

Example 14—Example Method of Initializing Reconstructed Database Table

The method of reconstructing the database table described in the flowchart 900 and the corresponding pseudocode can be further illustrated through examples below.

Figure 12:
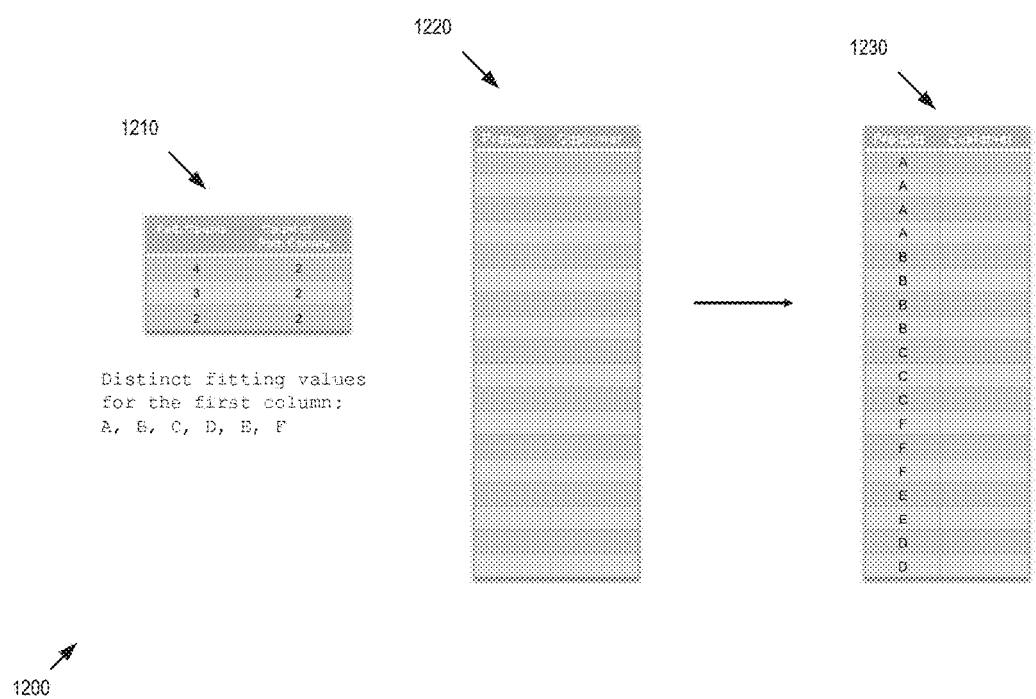
FIG. 12 is a diagram illustrating one example step of initializing the reconstructed two-column database table after the step depicted in FIG. 10.

FIG. 12 shows a diagram 1200 illustrating an example method of initializing the reconstructed database table corresponding to the 2-column database table 710 shown in FIG. 7.

The diagram 1200 shows the statistical artefacts associated with the first column ("Product"). Specifically, table 1210 lists the distinct path-count-sequences (i.e., path counts: 4, 3, 2) and counts for distinct path-count-sequences (i.e., count of path counts: 2, 2, 2), as calculated based on the first column of original values of the original database table 710 (see FIG. 7). Based on the distinct-value-count for the first column (i.e., 6), 6 distinct fitting values (i.e., A, B, C, D, E, F) for the first column can be generated, as described above (see FIG. 10).

The reconstructor can instantiate a reconstructed database table 1220 comprising 18×2 empty cells. The reconstructor knows the number of columns for the reconstructed database table because the statistical artefacts were calculated for 2 columns ("Product" and "Customer"). In addition, the reconstructor can also deduce the number of rows based on the distinct path-count-sequences and counts for distinct path-count-sequences associated with the first column, i.e., the number of rows=4×2+3×2+2×2=18.

The reconstructor can then initialize the first column ("Product") of the reconstructed database table by assigning the distinct fitting values (A-F) to the first column, as shown in table 1230. Based on the statistical artefacts listed in table 1210, two of the distinct fitting values will appear 4 times each (e.g., A and B), two other distinct fitting values will appear 3 times each (e.g., C and F), and the rest two distinct fitting values (e.g., D and E) will appear 2 times each. How to match and assign the distinct fitting values to different rows of the first column can be achieved randomly, sequentially, or using any other predefined logic, so long as the resulting first column retains the statistical artefacts specified in table 1210. For example, it is possible to assign E to 4 rows, assign F to 4 rows, assign C to 3 rows, assign D to 3 rows, assign A to 2 rows, and assign B to 2 rows, either randomly or non-randomly.

After initialization of the reconstructed database table, including assigning the distinct fitting values to the first column, the method can continue instantiating the remaining columns (e.g., "Customer") of the reconstructed database table as described in FIG. 9 (and the corresponding pseudocode) and illustrated below.

Example 15—Example Method of Selecting Fitting Rows

Figure 13:
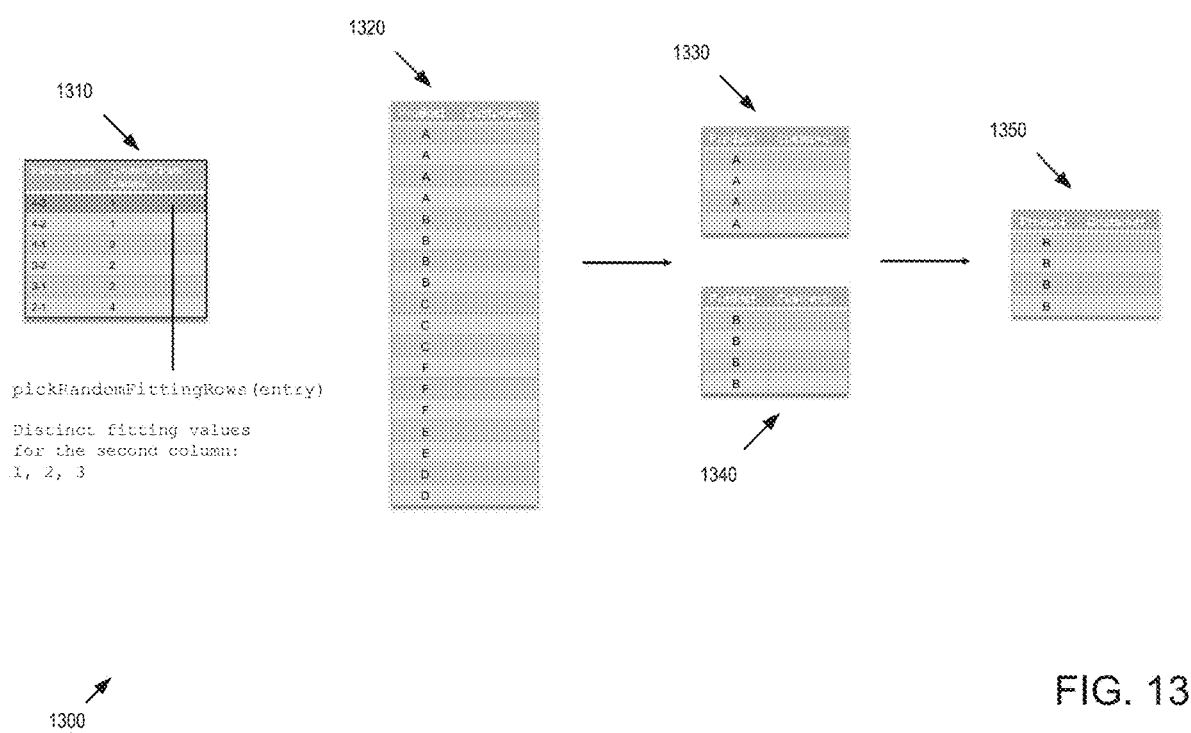
FIG. 13 is a diagram illustrating one example step of selecting fitting rows for reconstructing the two-column database table after the step depicted in FIG. 12.
Figure 14:
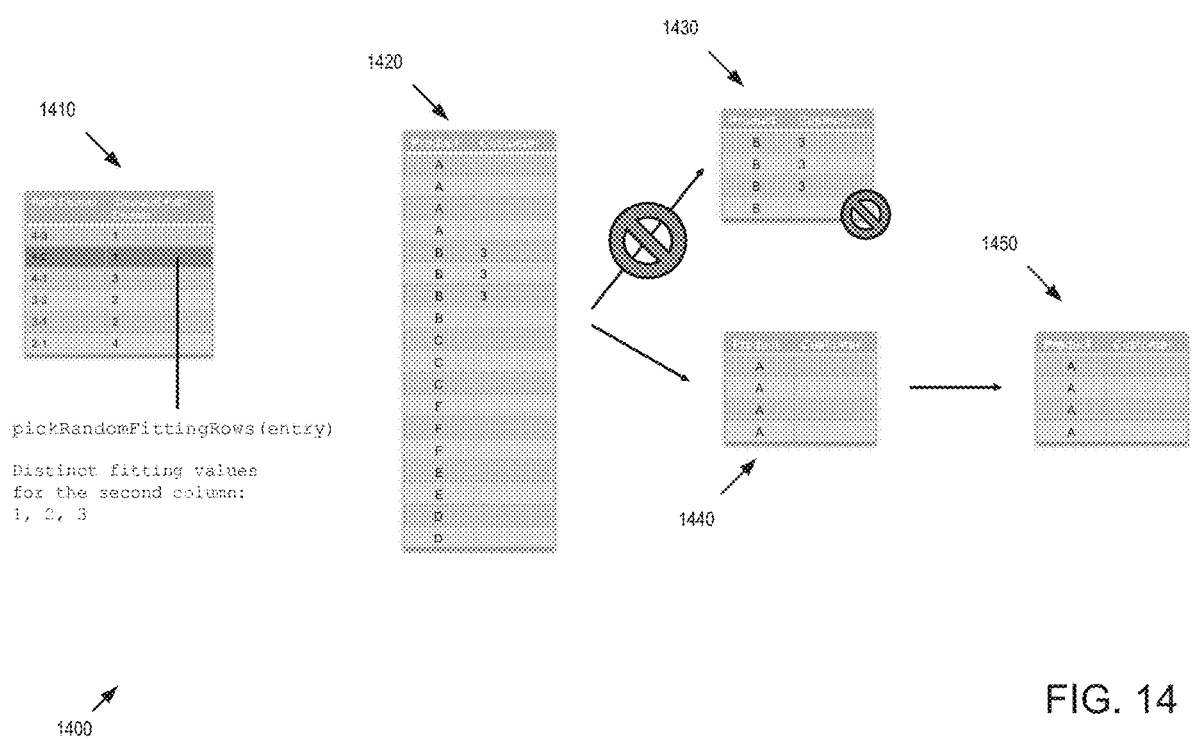
FIG. 14 is a diagram illustrating one example step of selecting fitting rows for reconstructing the two-column database table after the step depicted in FIG. 13.
Figure 15:
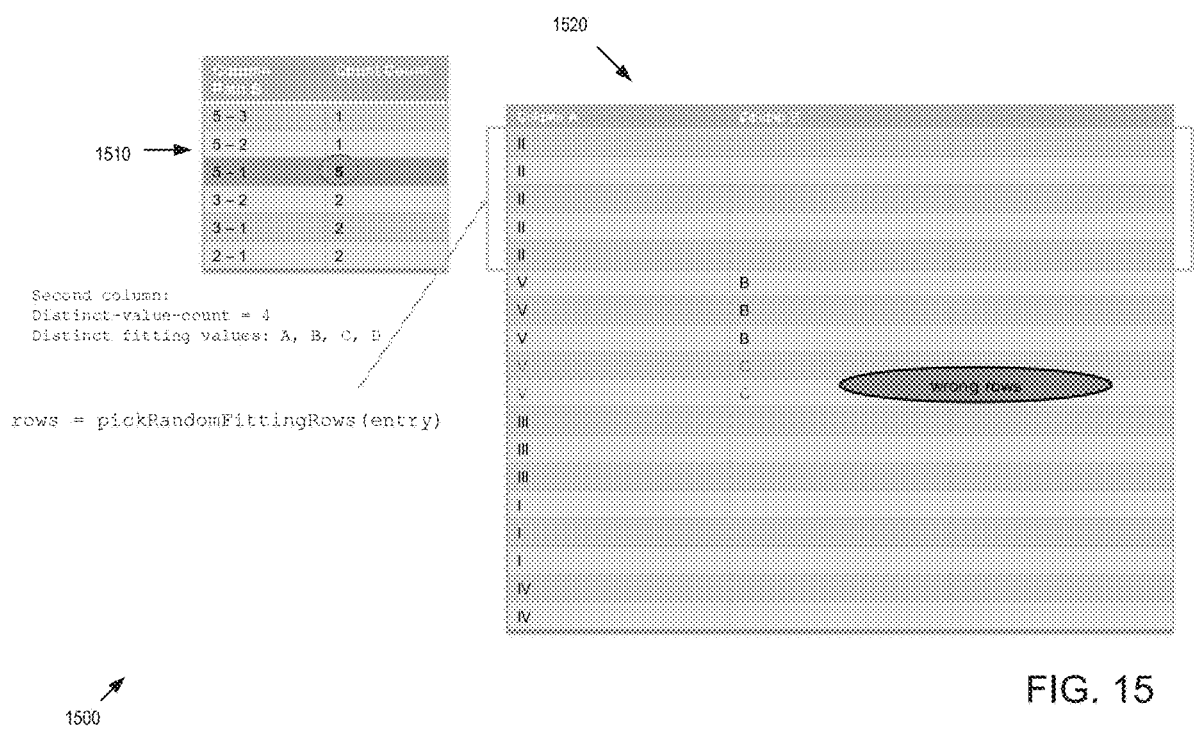
FIG. 15 is a diagram illustrating one example of incorrect selection of fitting rows that is avoided by the method described herein when reconstructing another database table.

FIGS. 13-15 illustrate an example method of selecting fitting rows for assigning selected distinct fitting values to the reconstructed database table.

FIG. 13 shows a diagram 1300 including the statistical artefacts 1310 associated with the second column ("Customer"), and the reconstructed database table 1320 in which the first column ("Product") has been instantiated. The diagram also shows that three distinct fitting values are generated for the second column: 1, 2, and 3 (because distinct-value-count=3 for the second column).

To instantiate the second column, the method can start by first evaluating the first distinct path-count-sequence 4-3. This indicates that one distinct fitting value for the second column must appear in 3 fitting rows, each of which has one distinct fitting value for the first column that appears exactly 4 times. To satisfy such requirement, there are two options 1330 and 1340 to choose from in this example: the 3 fitting rows can be selected from either rows 1-4 (where "Product"=A, i.e., the distinct fitting value A appears 4 times in the first column) or rows 5-8 (where "Product"=B, i.e., the distinct fitting value B appears 4 times in the first column).

In this example, the second option is randomly chosen as indicated by 1350, i.e., the 3 fitting rows will be selected from rows 5-8. In other embodiments, which option to choose from a plurality of options can be done non-randomly (e.g., sequentially, or through a predefined selection process). Further, which 3 rows in rows 5-8 will be selected as fitting rows can be done in a random or non-random manner.

FIG. 14 shows a diagram 1400 illustrating another step of instantiating the second column of the reconstructed database table, after the step shown in FIG. 13. Similarly, the statistical artefacts are listed in 1410. In this example, the reconstructed database table 1420 shows that rows 5-7 (corresponding to "Product"=B) are randomly selected as fitting rows, and the corresponding cells in the second column are assigned with a distinct fitting value 3 (how to select distinct fitting value is described more fully below). Since the distinct path-count-sequence 4-3 occurs only once (since the count for 4-3 is 1), the method can continue to process the next distinct path-count-sequence 4-2. This indicates that one distinct fitting value for the second column must appear in 2 fitting rows, each of which has one distinct fitting value for the first column that appears exactly 4 times.

Although both options 1430 and 1440 have a distinct fitting value (B and A, respectively) appearing 4 times in the first column, option 1430 is not available because there is only 1 empty cell left (at row 8, corresponding to "Product"=B) in the second column that satisfies the fitting row requirement (since the cells in rows 5-7 are already assigned distinct fitting value 3). That leaves option 1440 as the only choice as indicated by 1450, which has 4 empty cells (at rows 1-4, corresponding to "Product"=A) in the second column. Thus, the 2 fitting rows corresponding to the distinct path-count-sequence 4-2 can be selected (randomly or non-randomly) from rows 1-4. After a distinct fitting value is assigned to 2 empty cells in the selected 2 fitting rows, the method can continue to process the next distinct path-count-sequence 4-1 (since the count for 4-2 is 1).

FIG. 15 shows a diagram 1500 illustrating an example embodiment of dealing with a special situation when selecting fitting rows. This example illustrates one step of instantiating the second column of a reconstructed database table 1520 having a total of 3 columns (a more detailed example of instantiating a three-column reconstructed database table is described more fully below). Similarly, the statistical artefacts associated with the second column is listed in 1510. The example also shows that the distinct fitting values generated for the second column are A, B, C, and D, based on distinct-value-count of 4.

At the illustrated step, the first distinct path-count-sequence 5-3 has already been processed, and a distinct fitting value B has been assigned to rows 6-8 (corresponding to "Column A"=V). To process the second distinct path-count-sequence 5-2, presumably there are two options to select fitting rows for the assignment of selected fitting value (e.g., C): (1) selecting rows 9-10 (corresponding "Column A"=V) as indicated in 1520, or (2) selecting 2 rows from rows 1-5 (corresponding to "Column A"=II), since both options have enough empty cells to accommodate two fitting rows (e.g., 2 empty cells for option 1 and 5 empty cells for option 2).

However, according to some embodiments, option (1) should be rejected. This is because option (1) can lead to a potential situation that is incompatible with the prescribed statistical artifacts. For example, if option (1) were chosen and rows 9-10 (corresponding to "Column A"=V) were assigned with the distinct fitting value C, then the next step for processing the third distinct path-count-sequence 5-1, which occur 5 times, would require 5 distinct fitting values to be assigned to rows 1-5 (corresponding to "Column A"=II). However, this is impossible because there are only 4 distinct fitting values (A, B, C, and D) available, as limited by the distinct-value-count (4) for the second column.

To avoid such situations, when multiple options are available to select fitting rows for a distinct path-count-sequence, the method can apply a rule which prefers to select an option where there are more empty cells in the column corresponding to the distinct path-count-sequence than the distinct-value-count corresponding to the column. This can ensure proper instantiation of the reconstructed database table without conflicting with the prescribed statistical artifacts. Thus, in the depicted example, fitting rows should be selected from rows 1-5. This is because out of the two options (1) rows 1-5 corresponding to "Column A"=II and (2) rows 9-10 corresponding to "Column A"=V, the first option has more free cells (5) than the distinct-value-count (4) for the second column.

Example 16—Example Method of Selecting Distinct Fitting Values

Figure 16:
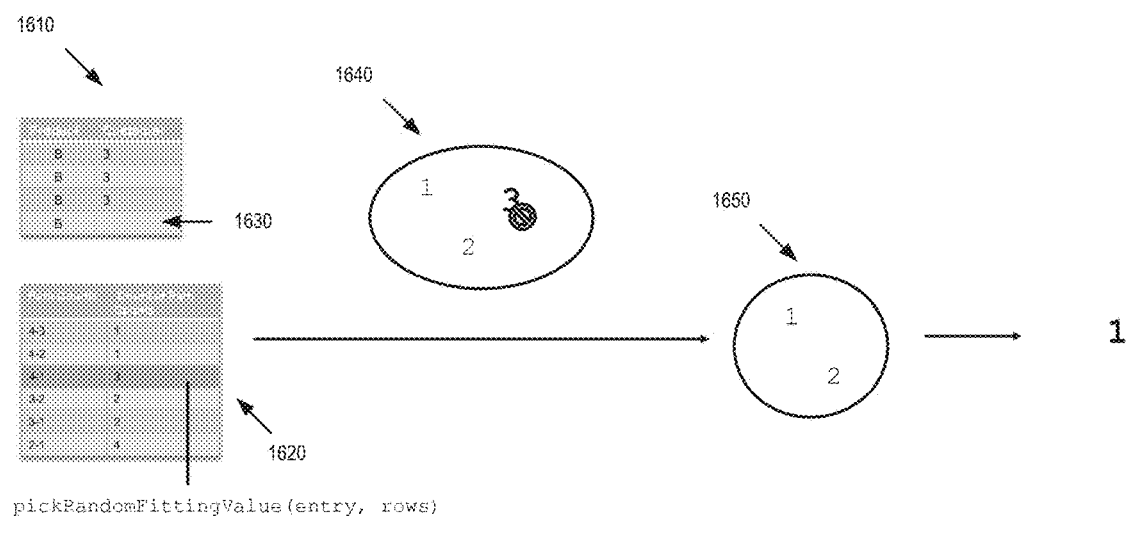
FIG. 16 is a diagram illustrating one example embodiment of selecting fitting values for reconstructing a database table.

FIG. 16 shows a diagram 1600 illustrating the method of selecting fitting values to be assigned to the selected fitting rows.

The diagram 1600 illustrates an example step of instantiating the second column of reconstructed database table 1610, following the step depicted in FIG. 14. Similarly, statistical artefacts including distinct path-count-sequences and counts for distinct path-count-sequences are listed in 1620. At the illustrated step, the third distinct path-count-sequence 4-1 is being processed. Based on the method described above, the row 1630 (corresponding to row 8 in table 1420), where the first column is assigned distinct fitting value B and the second column remains empty, is selected as the fitting row.

A distinct fitting value can then be selected for assignment to the empty cell in the selected fitting row 1630. As shown, the distinct fitting value can be selected from the data set 1640, which contains all distinct fitting values (1, 2, and 3) generated for the second column (see FIG. 10). However, because the distinct fitting value 3 has already been previously assigned to three rows corresponding to "Product"=B when processing the distinct path-count-sequence 4-3 (see FIG. 14), it must be disqualified as a candidate for the distinct fitting value to be assigned to the empty cell of the selected fitting row 1630. Otherwise, it would create 4 rows with "Product"=B and "Customer"=3. That would correspond to a new 4-4 distinct path-count-sequence, which is not prescribed by the statistical artefacts 1620 and create an inconsistency with the first distinct path-count-sequence 4-3. Thus, a reduced subset 1650 containing only 1 and 2 is used for selection of the distinct fitting value. In the depicted example, distinct fitting value 1 is selected from the subset 1650, the selection of which can be made either in random or non-random manner.

Example 17—Example Reconstruction of a Three-Column Database Table

To further illustrate the methods described above, FIGS. 17-40 provide a walk-through of some example steps occurred when instantiating a reconstructed database table based on statistical artefacts obtained from an original three-column database table.

Figure 17:
FIG. 17 is a diagram illustrating one example three-column original database table.

FIG. 17 shows an example original database table 1700 comprising original values arranged in 3 columns and 18 rows. As shown, the first column ("Product") comprises 5 distinct values: A, B, C, D, and E. The second column ("Customer") comprises 4 distinct values: AAA, BBB, CCC, and DDD. The third column ("Order Number") comprises 7 distinct values: O1, O2, O3, O11, O12, O21, and O31.

Figure 18:
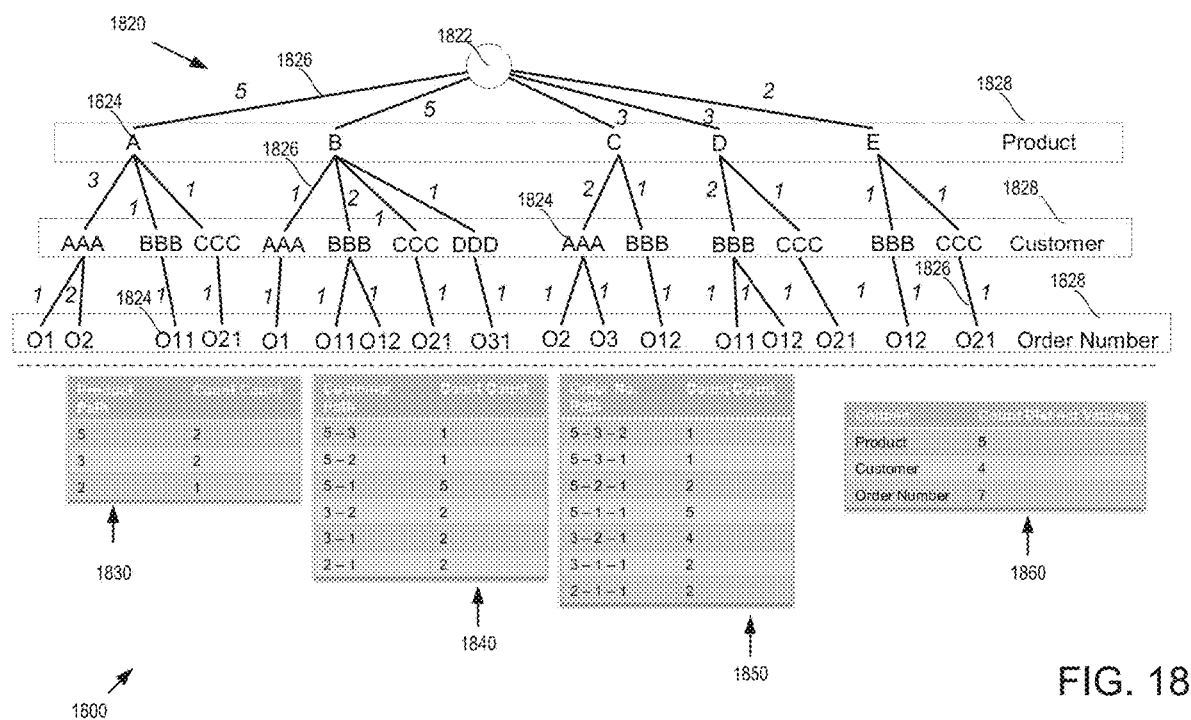
FIG. 18 is an example embodiment of calculating the statistical artifacts associated with the original database table depicted in FIG. 17.

FIG. 18 shows a diagram 1800 illustrating the results of calculating statistical artefacts from the original database table 1700. Specifically, a path tree 1820 is constructed based on the original database table 1700 using the method described above. As shown, the path tree 1820 comprises a root 1822 and a plurality of path-mark-nodes 1824 connected by edges 1826, and the path-mark-nodes 1824 are arranged in three layers 1828 corresponding to the three columns of the original database table 1700. The statistical artefacts associated with the original database table 1700 can then be derived based on the path tree 1820. For example, the distinct path-count-sequences and counts for the distinct path-count-sequences corresponding to the first column ("Product"), the second column ("Customer") and the third column ("Order Number") are respectively listed in tables 1830, 1840, and 1850. The distinct-value-counts corresponding to the three columns are listed in table 1860.

Figure 19:
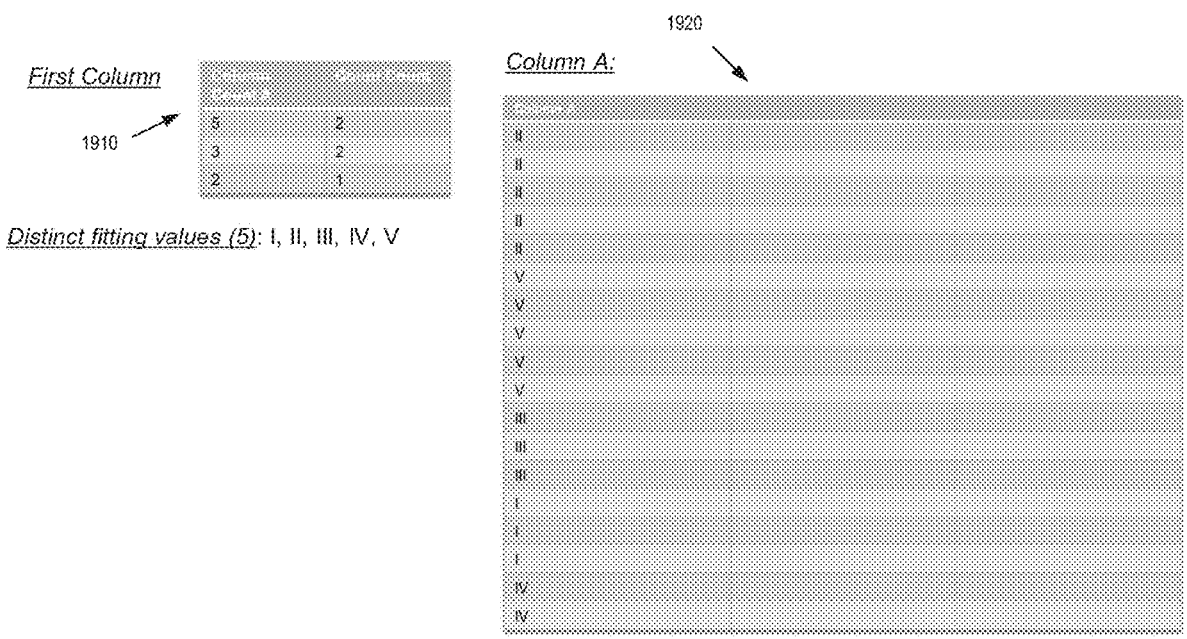
FIG. 19 is a diagram illustrating one example step of reconstructing the database table depicted in FIG. 17 based on the calculated statistical artifacts.

FIG. 19 shows a diagram illustrating an initial step of instantiating a reconstructed database table 1920 corresponding to the 3-column database table 1700. As shown, the first column ("A") of the reconstructed database table 1920 has been instantiated by 5 distinct fitting values (I, II, III, IV, and V) based on the distinct path-count-sequences and counts for the distinct path-count-sequences corresponding to the first column, as listed in 1910. The second and third columns contain empty cells.

FIG. 20 shows a diagram illustrating a step of instantiating the reconstructed database table after the step depicted in FIG. 19. As shown, 4 distinct fitting values (A, B, C, and D) have been generated for instantiating the second column of the reconstructed database table. At this step, the first distinct path-count-sequence 5-3 corresponding to the second column is being processed. Five rows corresponding to "Column A"=V (i.e., rows 6-10) are selected as fitting rows.

Figure 21:
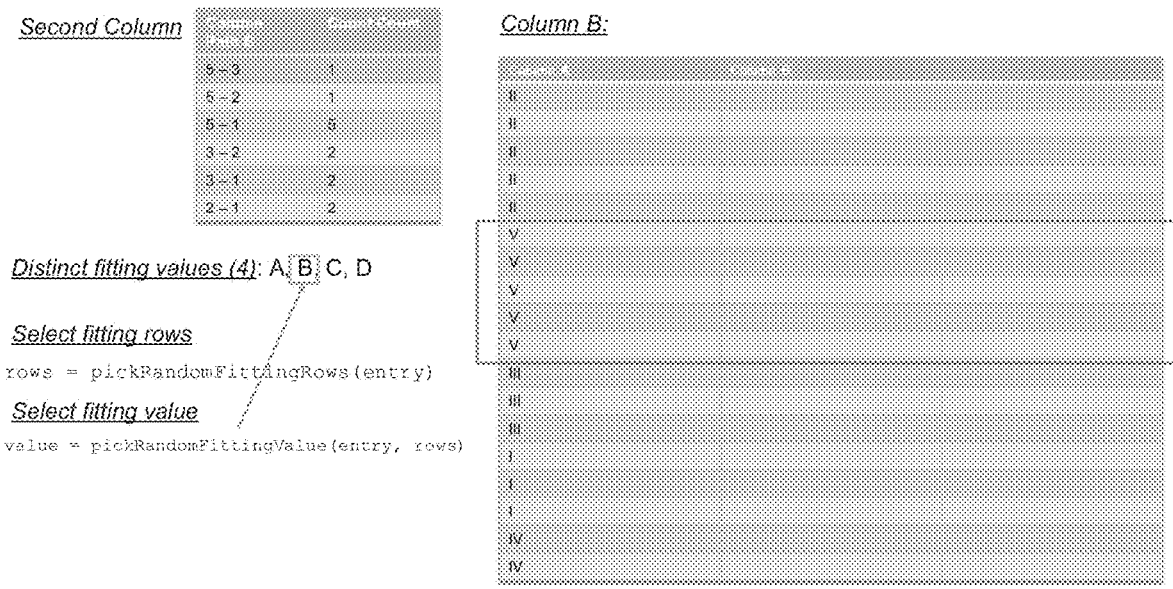
FIG. 21 is a diagram illustrating one example step of reconstructing the database table after the step depicted in FIG. 20.

FIG. 21 shows a diagram illustrating a step of instantiating the reconstructed database table after the step depicted in FIG. 20. At this step, the distinct fitting value B is selected, which will be assigned to 3 of the empty cells in the second column selected from the previously selected fitting rows (i.e., rows 6-10).

Figure 22:
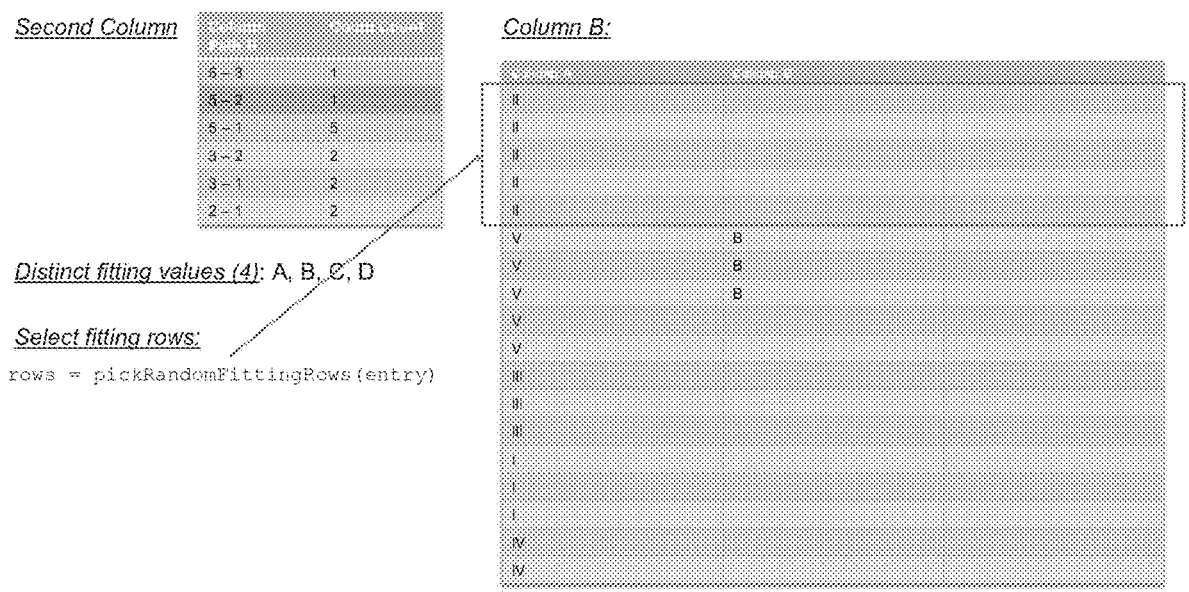
FIG. 22 is a diagram illustrating one example step of reconstructing the database table after the step depicted in FIG. 21.

FIG. 22 shows a diagram illustrating a step of instantiating the reconstructed database table after the step depicted in FIG. 21. At this step, the second distinct path-count-sequence 5-2 corresponding to the second column is being processed. As shown, the previously selected distinct fitting value B has been assigned to 3 empty cells in the second column corresponding to 3 of the previously selected fitting rows (i.e., rows 6-8). In addition, five rows corresponding to "Column A"=II (i.e., rows 1-5) are selected as fitting rows. As described above with reference to FIG. 15, rows 9-10 cannot be selected as fitting rows because the count of empty cells in the second column corresponding to "Column A"=V is 2, which is smaller than the distinct-value-count (4) corresponding to the second column.

FIG. 23 shows a diagram illustrating a step of instantiating the reconstructed database table after the step depicted in FIG. 22. At this step, the distinct fitting value C is selected, which will be assigned to 2 of the empty cells in the second column selected from the previously selected fitting rows (i.e., rows 1-5).

Figure 24:
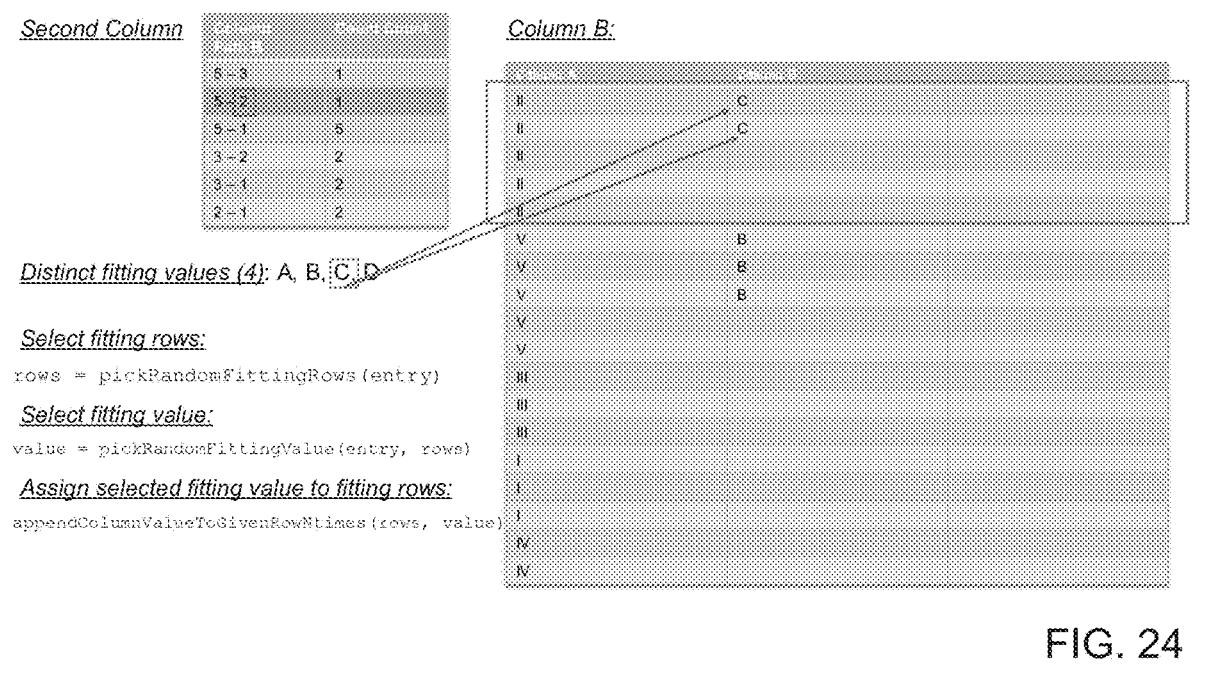

FIG. 24 shows a diagram illustrating a step of instantiating the reconstructed database table after the step depicted in FIG. 23. At this step, the selected distinct fitting value C is assigned to 2 empty cells in the second column corresponding to 2 of the previously selected fitting rows (i.e., rows 1-2).

Figure 25:
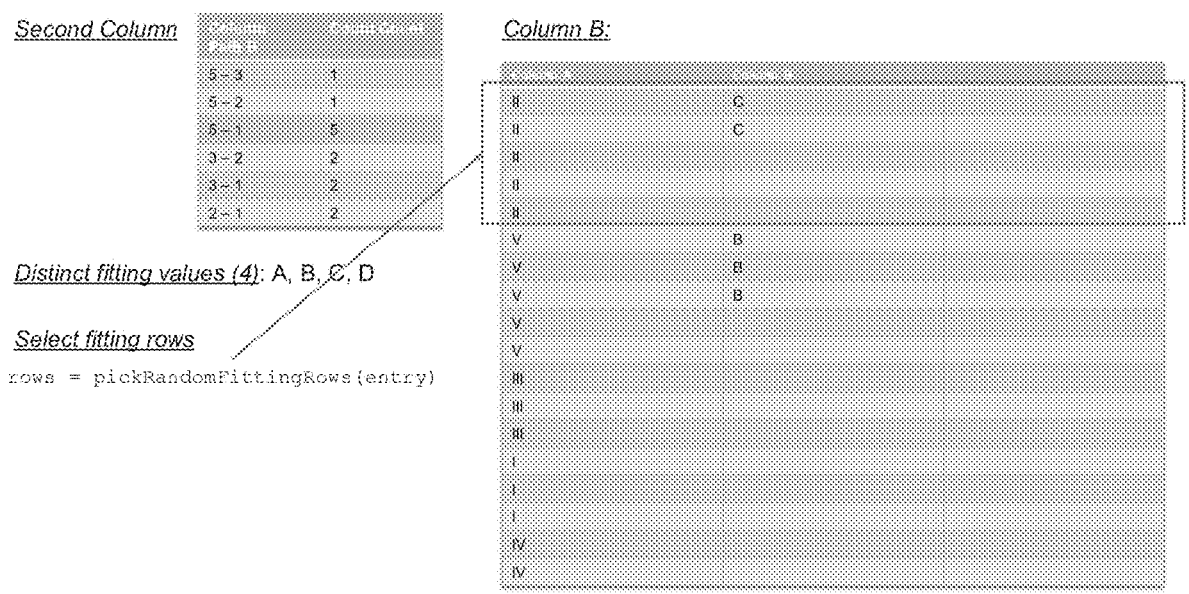
FIG. 25 is a diagram illustrating one example step of reconstructing the database table after the step depicted in FIG. 24.

FIG. 25 shows a diagram illustrating a step of instantiating the reconstructed database table after the step depicted in FIG. 24. At this step, the third distinct path-count-sequence 5-1 corresponding to the second column is being processed for the first time (note that 5-1 must be processed 5 times). As shown, five rows corresponding to "Column A"=II (i.e., rows 1-5) are selected as fitting rows.

Figure 26:
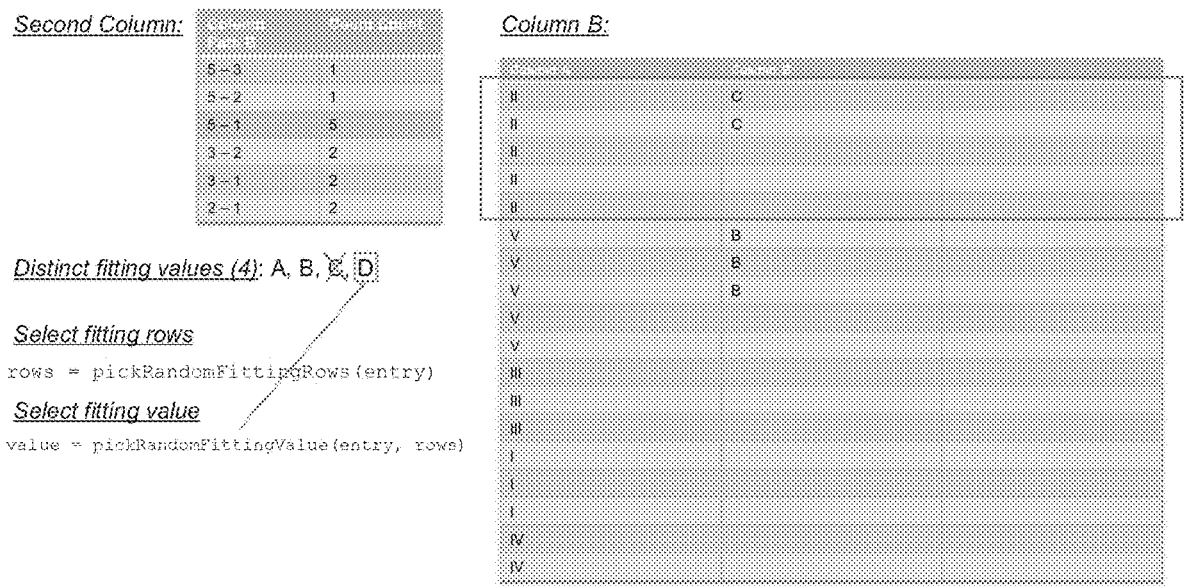
FIG. 26 is a diagram illustrating one example step of reconstructing the database table after the step depicted in FIG. 25.

FIG. 26 shows a diagram illustrating a step of instantiating the reconstructed database table after the step depicted in FIG. 25. At this step, the distinct fitting value D is selected, which will be assigned to 1 of the empty cells in the second column selected from the previously selected fitting rows (i.e., rows 1-5). Note that the distinct fitting value C cannot be selected because it has already been assigned to 2 rows (i.e., rows 1-2) corresponding to "Column A"=II.

FIG. 27 shows a diagram illustrating a step of instantiating the reconstructed database table after the step depicted in FIG. 26. At this step, the selected distinct fitting value D is assigned to one empty cell in the second column corresponding to one of the previously selected fitting rows (i.e., row 3).

Figure 28:
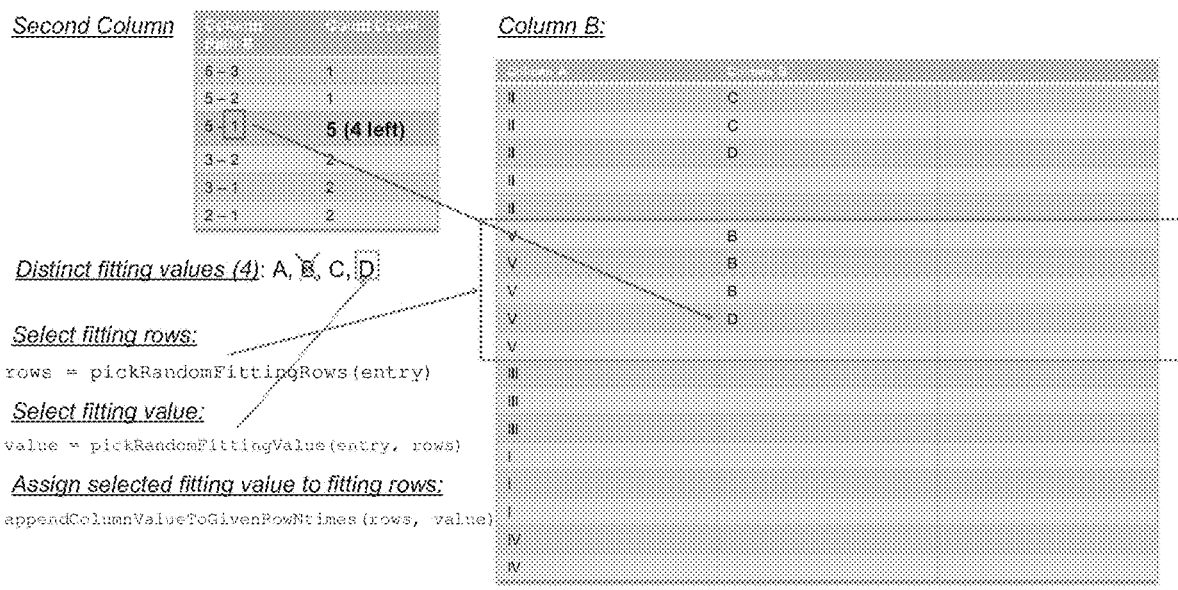
FIG. 28 is a diagram illustrating one example step of reconstructing the database table after the step depicted in FIG. 27.

FIG. 28 shows a diagram illustrating a step of instantiating the reconstructed database table after the step depicted in FIG. 27. At this step, the third distinct path-count-sequence 5-1 corresponding to the second column is being processed for the second time. As shown, five rows corresponding to "Column A"=V (i.e., rows 6-10) are selected as fitting rows. In addition, the distinct fitting value D is selected and assigned to one of the selected fitting rows (i.e., row 9). Note that the distinct fitting value B cannot be selected because it has already been assigned to 3 rows (i.e., rows 6-8) corresponding to "Column A"=V.

Figure 29:
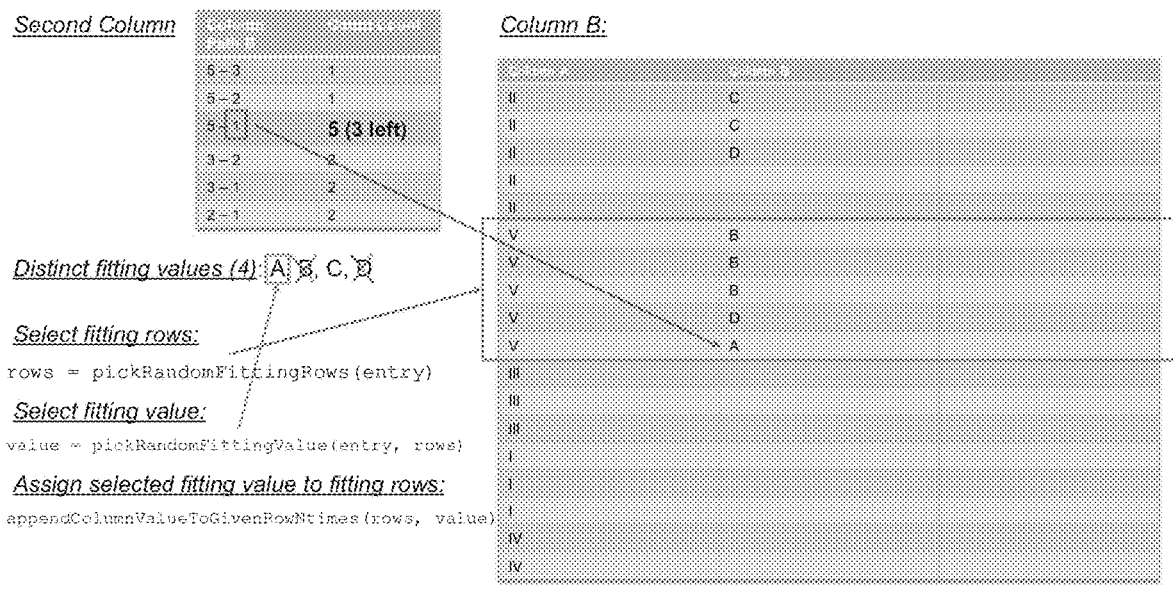
FIG. 29 is a diagram illustrating one example step of reconstructing the database table after the step depicted in FIG. 28.

FIG. 29 shows a diagram illustrating a step of instantiating the reconstructed database table after the step depicted in FIG. 28. At this step, the third distinct path-count-sequence 5-1 corresponding to the second column is being processed for the third time. As shown, five rows corresponding to "Column A"=V (i.e., rows 6-10) are selected as fitting rows. In addition, the distinct fitting value A is selected and assigned to one of the selected fitting rows (i.e., row 10). Note that the distinct fitting values B and D cannot be selected because they have already been assigned to respective rows (i.e., rows 6-9) corresponding to "Column A"=V.

Figure 30:
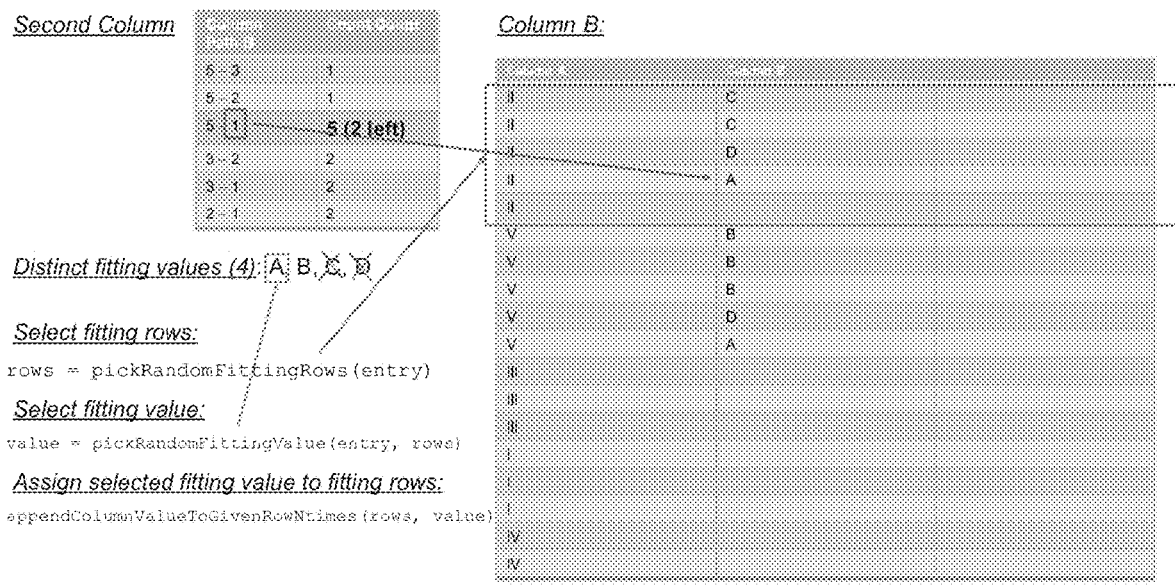
FIG. 30 is a diagram illustrating one example step of reconstructing the database table after the step depicted in FIG. 29.

FIG. 30 shows a diagram illustrating a step of instantiating the reconstructed database table after the step depicted in FIG. 29. At this step, the third distinct path-count-sequence 5-1 corresponding to the second column is being processed for the fourth time. As shown, five rows corresponding to "Column A"=II (i.e., rows 1-5) are selected as fitting rows. In addition, the distinct fitting value A is selected and assigned to one of the selected fitting rows (i.e., row 4). Note that the distinct fitting values C and D cannot be selected because they have already been assigned to respective rows (i.e., rows 1-3) corresponding to "Column A"=II.

Figure 31:
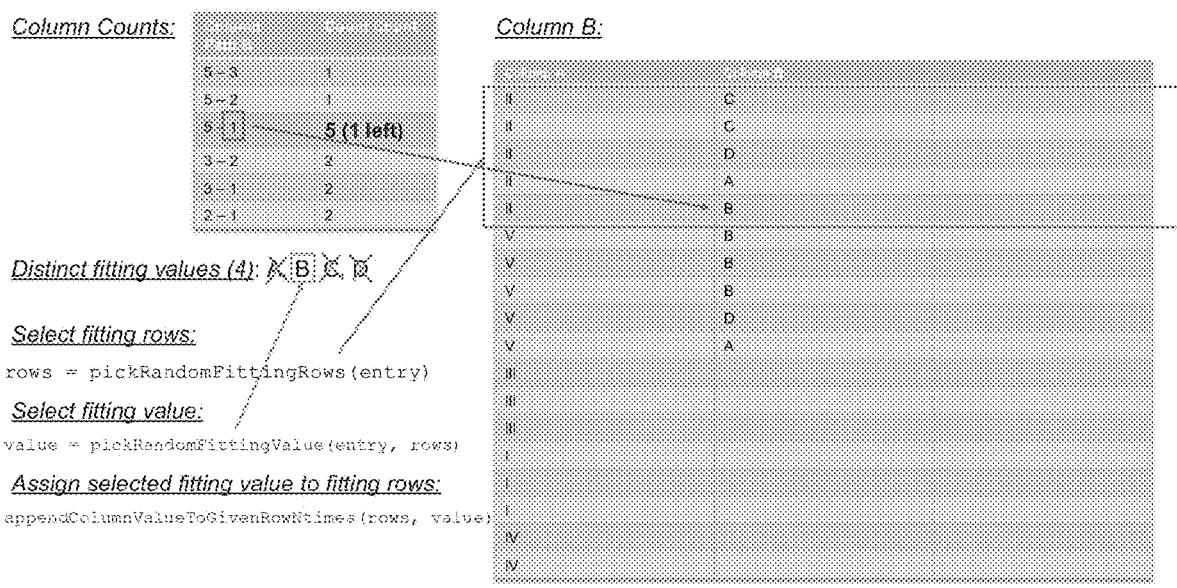
FIG. 31 is a diagram illustrating one example step of reconstructing the database table after the step depicted in FIG. 30.

FIG. 31 shows a diagram illustrating a step of instantiating the reconstructed database table after the step depicted in FIG. 30. At this step, the third distinct path-count-sequence 5-1 corresponding to the second column is being processed for the fifth time. As shown, five rows corresponding to "Column A"=II (i.e., rows 1-5) are selected as fitting rows. In addition, the distinct fitting value B is selected and assigned to one of the selected fitting rows (i.e., row 5). Note that the distinct fitting values A, C and D cannot be selected because they have already been assigned to respective rows (i.e., rows 1-4) corresponding to "Column A"=II.

Figure 32:
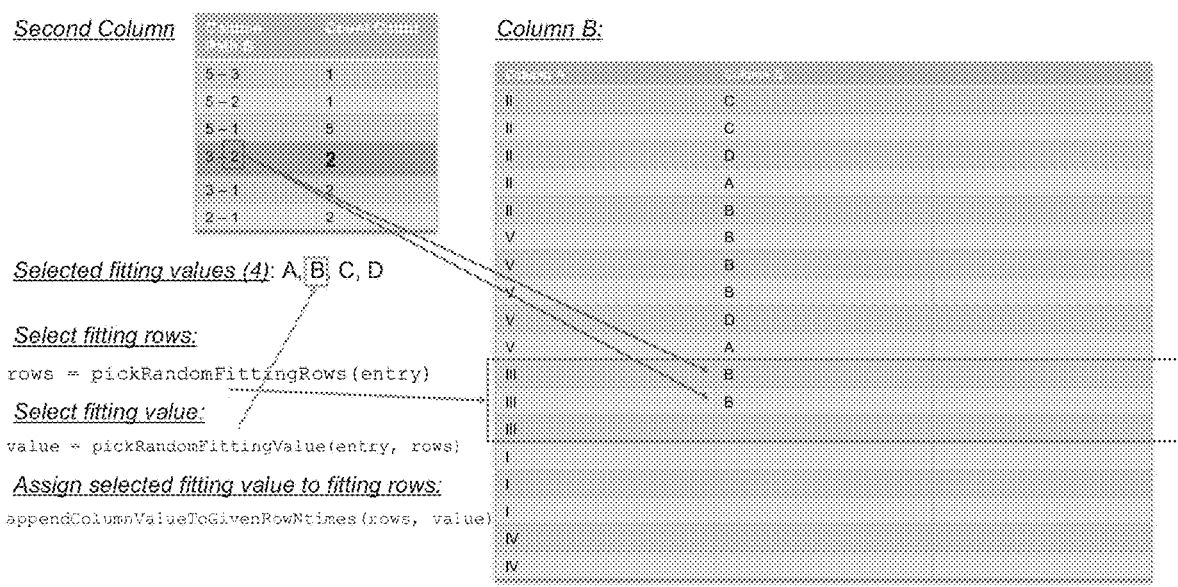
FIG. 32 is a diagram illustrating one example step of reconstructing the database table after the step depicted in FIG. 31.

FIG. 32 shows a diagram illustrating a step of instantiating the reconstructed database table after the step depicted in FIG. 31. At this step, the fourth distinct path-count-sequence 3-2 corresponding to the second column is being processed for the first time (note that 3-2 must be processed 2 times). As shown, 3 rows corresponding to "Column A"=III (i.e., rows 11-13) are selected as fitting rows. In addition, the distinct fitting value B is selected and assigned to two of the selected fitting rows (i.e., rows 11-12).

Figure 33:
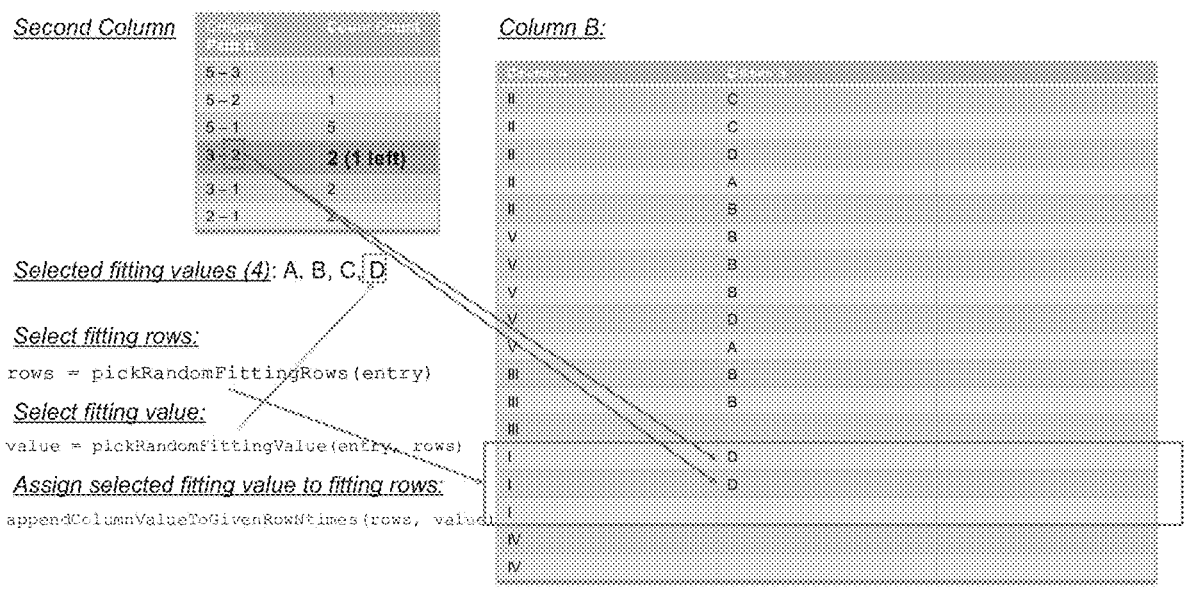
FIG. 33 is a diagram illustrating one example step of reconstructing the database table after the step depicted in FIG. 32.

FIG. 33 shows a diagram illustrating a step of instantiating the reconstructed database table after the step depicted in FIG. 32. At this step, the fourth distinct path-count-sequence 3-2 corresponding to the second column is being processed for the second time. As shown, 3 rows corresponding to "Column A"=I (i.e., rows 14-16) are selected as fitting rows. In addition, the distinct fitting value D is selected and assigned to two of the selected fitting rows (i.e., rows 14-15).

Figure 34:
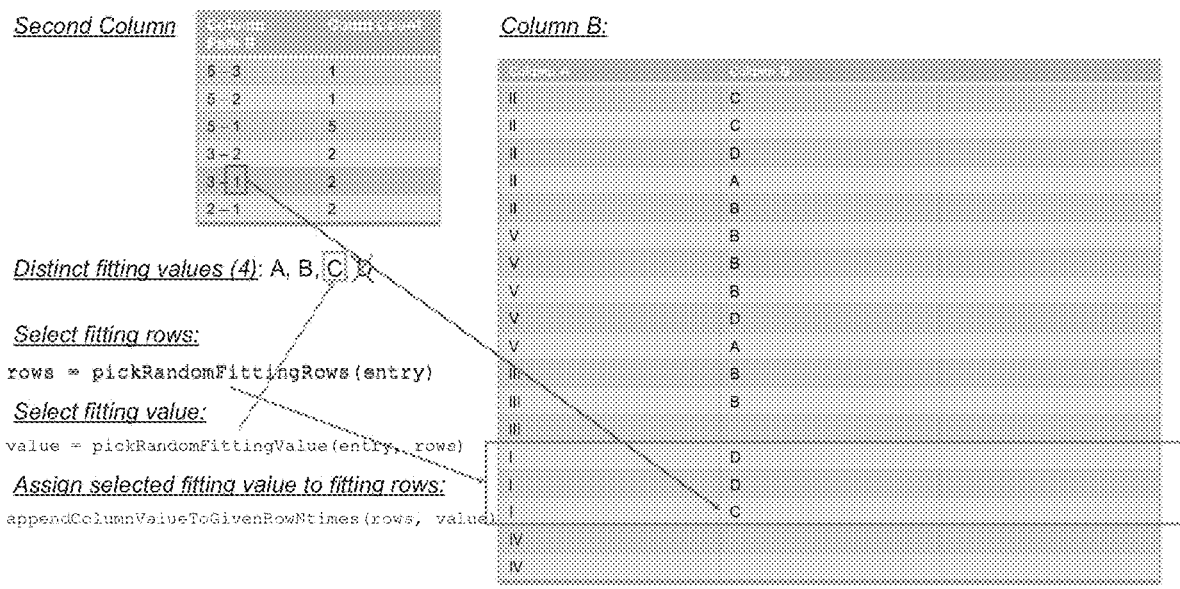
FIG. 34 is a diagram illustrating one example step of reconstructing the database table after the step depicted in FIG. 33.

FIG. 34 shows a diagram illustrating a step of instantiating the reconstructed database table after the step depicted in FIG. 33. At this step, the fifth distinct path-count-sequence 3-1 corresponding to the second column is being processed for the first time (note that 3-1 must be processed 2 times). As shown, 3 rows corresponding to "Column A"=I (i.e., rows 14-16) are selected as fitting rows. In addition, the distinct fitting value C is selected and assigned to one of the selected fitting rows (i.e., row 16). Note that the distinct fitting value D cannot be selected because it has already been assigned to 2 rows (i.e., rows 14-15) corresponding to "Column A"=I.

Figure 35:
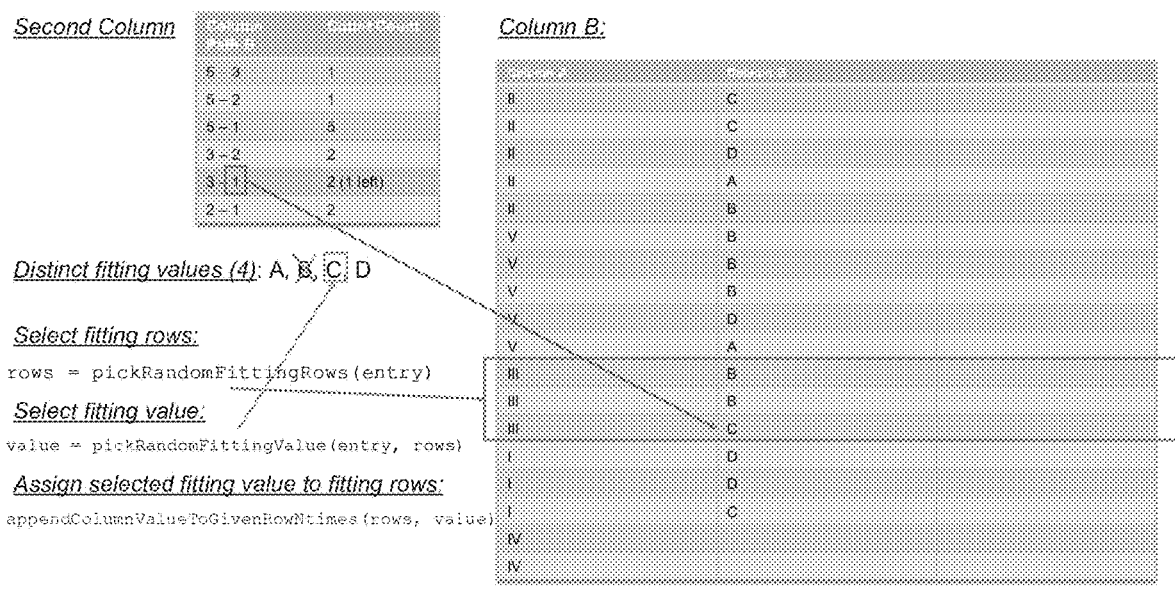
FIG. 35 is a diagram illustrating one example step of reconstructing the database table after the step depicted in FIG. 34.

FIG. 35 shows a diagram illustrating a step of instantiating the reconstructed database table after the step depicted in FIG. 34. At this step, the fifth distinct path-count-sequence 3-1 corresponding to the second column is being processed for the second time. As shown, 3 rows corresponding to "Column A"=III (i.e., rows 11-13) are selected as fitting rows. In addition, the distinct fitting value C is selected and assigned to one of the selected fitting rows (i.e., row 13). Note that the distinct fitting value B cannot be selected because it has already been assigned to 2 rows (i.e., rows 11-12) corresponding to "Column A"=III.

Figure 36:
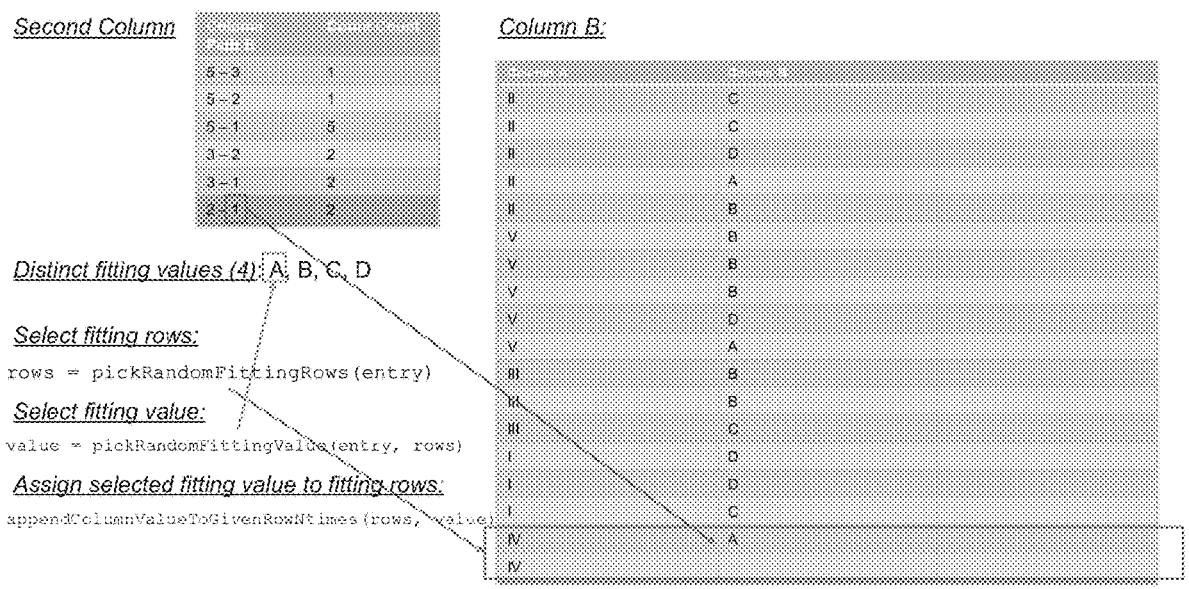
FIG. 36 is a diagram illustrating one example step of reconstructing the database table after the step depicted in FIG. 35.

FIG. 36 shows a diagram illustrating a step of instantiating the reconstructed database table after the step depicted in FIG. 35. At this step, the last distinct path-count-sequence 2-1 corresponding to the second column is being processed for the first time (note that 2-1 must be processed 2 times). As shown, 2 rows corresponding to "Column A"=IV (i.e., rows 17-18) are selected as fitting rows. In addition, the distinct fitting value A is selected and assigned to one of the selected fitting rows (i.e., row 17).

Figure 37:
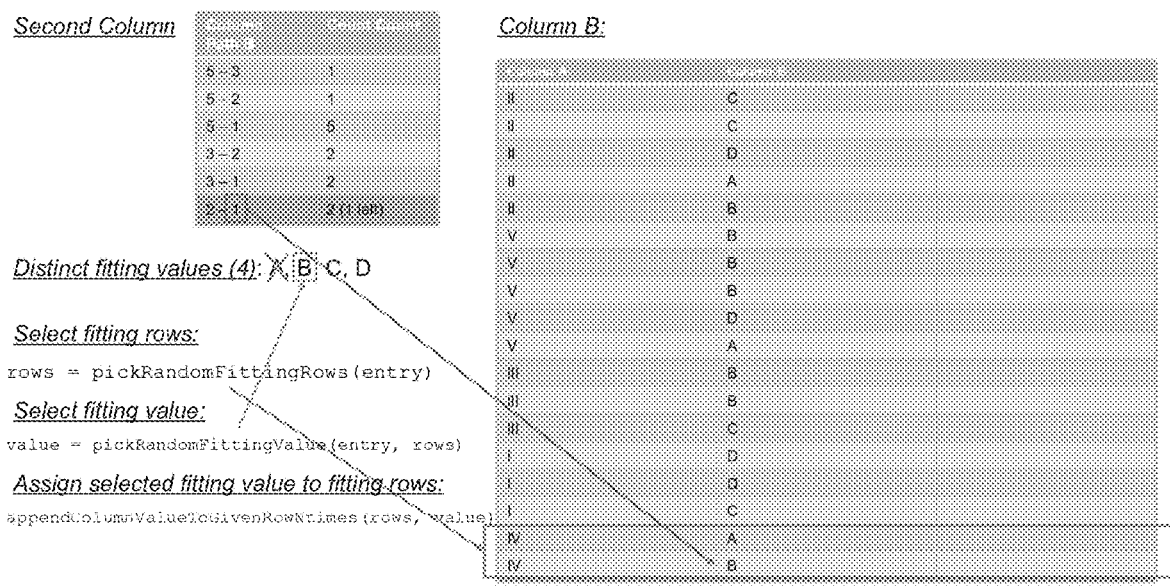
FIG. 37 is a diagram illustrating one example step of reconstructing the database table after the step depicted in FIG. 36.

FIG. 37 shows a diagram illustrating a step of instantiating the reconstructed database table after the step depicted in FIG. 36. At this step, the last distinct path-count-sequence 2-1 corresponding to the second column is being processed for the second time. As shown, 2 rows corresponding to "Column A"=IV (i.e., rows 17-18) are selected as fitting rows. In addition, the distinct fitting value B is selected and assigned to one of the selected fitting rows (i.e., row 18). Note that the distinct fitting value A cannot be selected because it has already been assigned to one row (i.e., row 17) corresponding to "Column A"=IV. After the completion of this step, the second column of the reconstructed database table has been complete instantiated.

Figure 38:
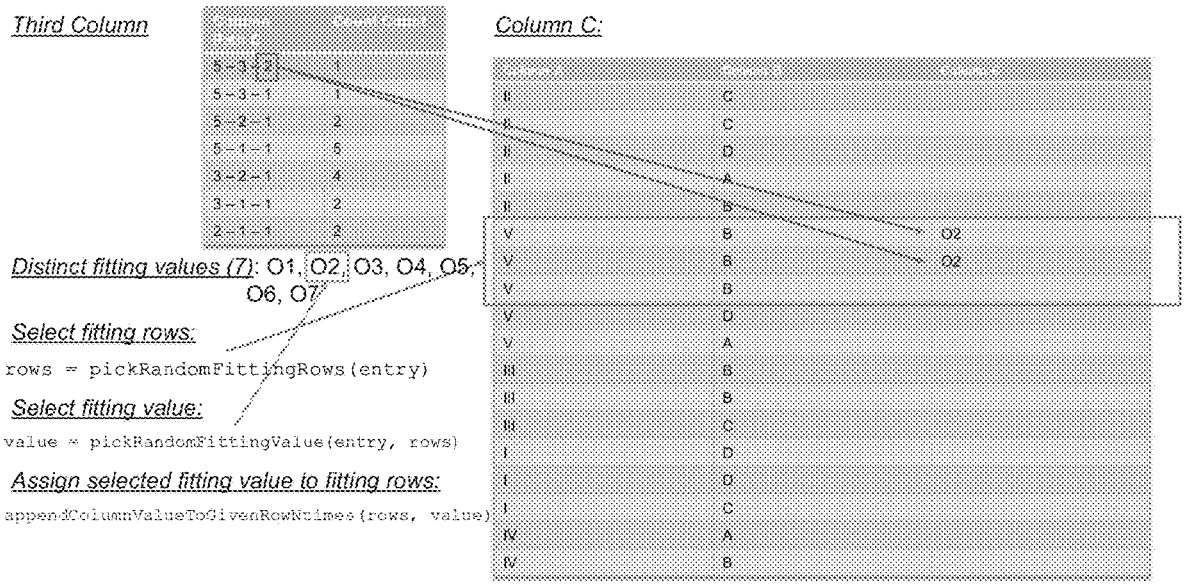
FIG. 38 is a diagram illustrating one example step of reconstructing the database table after the step depicted in FIG. 37.

FIG. 38 shows a diagram illustrating a step of instantiating the reconstructed database table after the step depicted in FIG. 37. As shown, 7 distinct fitting values (O1, O2, O3, O4, O5, O6, and O7) have been generated for instantiating the third column of the reconstructed database table. At this step, the first distinct path-count-sequence 5-3-2 corresponding to the third column is being processed. As shown, three rows corresponding to "Column A"=V && "Column B"=B (i.e., rows 6-8) are selected as fitting rows. In addition, the distinct fitting value O2 is selected and assigned to two of the selected fitting rows (i.e., rows 6-7).

Figure 39:
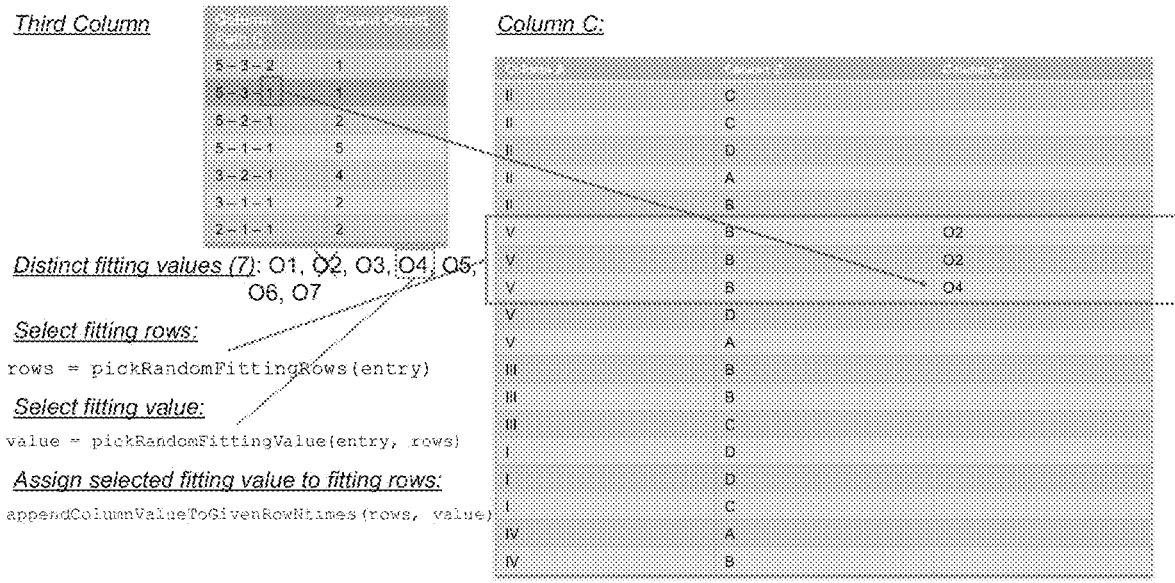
FIG. 39 is a diagram illustrating one example step of reconstructing the database table after the step depicted in FIG. 38.

FIG. 39 shows a diagram illustrating a step of instantiating the reconstructed database table after the step depicted in FIG. 38. At this step, the second distinct path-count-sequence 5-3-1 corresponding to the third column is being processed. As shown, three rows corresponding to "Column A"=V && "Column B"=B (i.e., rows 6-8) are selected as fitting rows. In addition, the distinct fitting value O4 is selected and assigned to one of the selected fitting rows (i.e., row 8). Note that the distinct fitting value O2 cannot be selected because it has already been assigned to two rows (i.e., row 6-7) corresponding to "Column A"=V && "Column B"=B.

FIG. 40 shows a diagram illustrating the final step of instantiating the reconstructed database table, where all cells in the third column have been assigned. The intermediate results after the step depicted in FIG. 39, which can be obtained following the same method described above, are omitted for simplicity.

Figure 41:
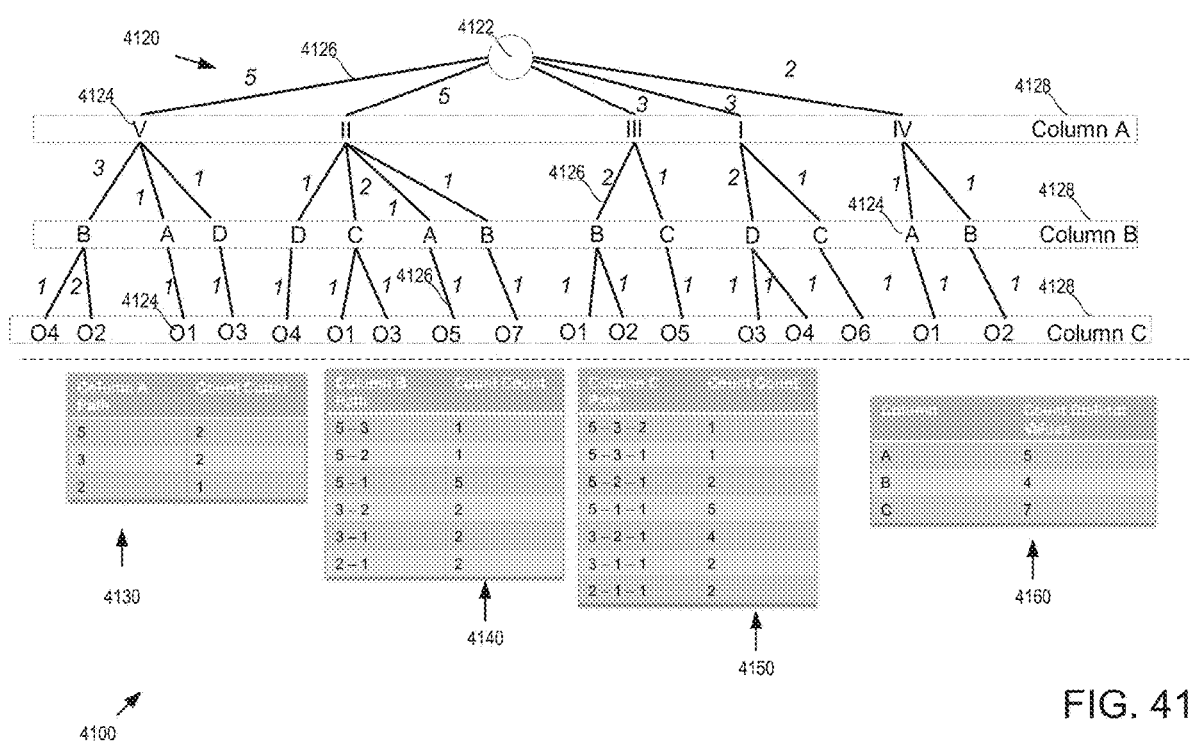
FIG. 41 is a diagram illustrating a path tree corresponding to the reconstructed database table depicted in FIG. 40 and the corresponding statistical artefacts.
Figure 42:
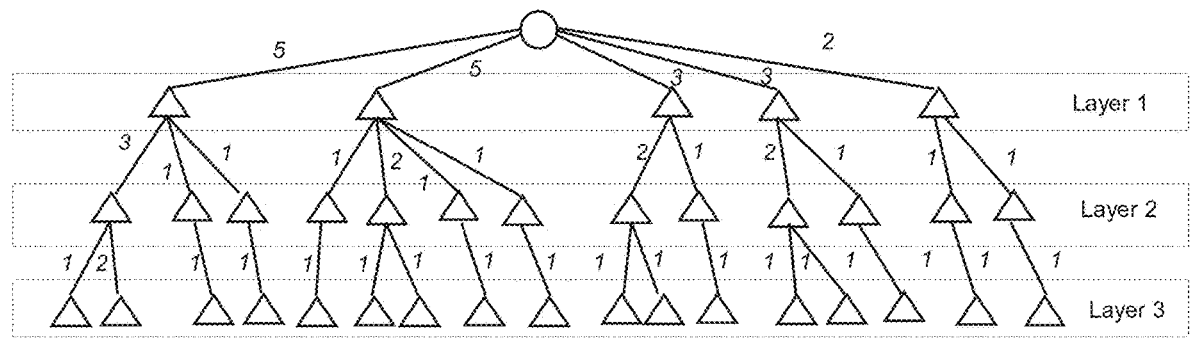
FIG. 42 is a diagram illustrating a tree topology corresponding to the path tree depicted in FIG. 41.

FIG. 41 shows a diagram 4100 illustrating a path tree 4120 is constructed based on the reconstructed database table depicted in FIG. 40. As shown, the path tree 4120 comprises a root 4122 and a plurality of path-mark-nodes 4124 connected by edges 4126, and the path-mark-nodes 4124 are arranged in three layers 4128 corresponding to the three columns of the reconstructed database table. Clearly, the path tree 4120 has an identical tree topology as the path tree 1820 (see FIG. 18) constructed based on the original database table, as further shown in FIG. 42. The statistical artefacts associated with the reconstructed database table can then be derived based on the path tree 4120. For example, the distinct path-count-sequences and counts for the distinct path-count-sequences corresponding to the three columns ("Column A," "Column B," and "Column C") are respectively listed in tables 4130, 4140, and 4150. The distinct-value-counts corresponding to the three columns are listed in table 4160. Clearly, the statistical artefacts calculated based on the reconstructed database table are identical to the corresponding statistical artefacts calculated based on the original database table (see FIG. 18).

Example 18—Example Advantages

A number of advantages can be achieved via the technology described herein. For example, the technology described herein allows a reconstructor computing system to automatically generate realistic mock data that more intelligently simulate the user's actual data, without the need for the users to transmit actual data, thus avoiding issues related to data transfer such as size limitations, sampling anomalies, confidentiality agreements, data privacy regulations, or the like.

Because the reconstructed database table and the original database table can share an identical path tree topology, important statistical properties of the original database tables can be retained by the reconstructed database tables. Furthermore, the disclosed technology can ensure the foreign key relationship between original database tables can be retained in the reconstructed database tables. Thus, the reconstructed database tables can be used as high-fidelity and realistic data source for investigation of technical problems encountered by the users. Moreover, the technology described herein is highly scalable. For example, it can be adapted to generate realistic mock data to satisfy varying needs of the users irrespective of data sources, data types, data sizes, and/or other factors.

Thus, realistic testing, analysis, and reconstruction of observed query behavior (e.g., including bugs or poor performance) can be accomplished even in the face of size limitations, confidentiality concerns, or privacy requirements.

Example 19—Example Computing Systems

Figure 43:
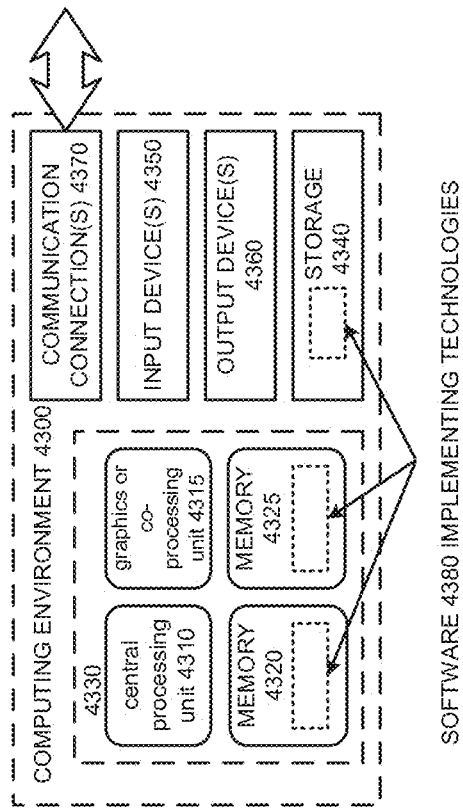
FIG. 43 is a block diagram of an example computing system in which described embodiments can be implemented.

FIG. 43 depicts an example of a suitable computing system 4300 in which the described innovations can be implemented. The computing system 4300 is not intended to suggest any limitation as to scope of use or functionality of the present disclosure, as the innovations can be implemented in diverse computing systems.

With reference to FIG. 43, the computing system 4300 includes one or more processing units 4310, 4315 and memory 4320, 4325. In FIG. 43, this basic configuration 4330 is included within a dashed line. The processing units 4310, 4315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 43 shows a central processing unit 4310 as well as a graphics processing unit or co-processing unit 4315. The tangible memory 4320, 4325 can be volatile memory (e.g., registers, cache, RAM), non-volatile memory (e.g., ROM, EEPROM, flash memory, etc.), or some combination of the two, accessible by the processing unit(s) 4310, 4315. The memory 4320, 4325 stores software 4380 implementing one or more innovations described herein, in the form of computer-executable instructions suitable for execution by the processing unit(s) 4310, 4315.

A computing system 4300 can have additional features. For example, the computing system 4300 includes storage 4340, one or more input devices 4350, one or more output devices 4360, and one or more communication connections 4370, including input devices, output devices, and communication connections for interacting with a user. An interconnection mechanism (not shown) such as a bus, controller, or network interconnects the components of the computing system 4300. Typically, operating system software (not shown) provides an operating environment for other software executing in the computing system 4300, and coordinates activities of the components of the computing system 4300.

The tangible storage 4340 can be removable or non-removable, and includes magnetic disks, magnetic tapes or cassettes, CD-ROMs, DVDs, or any other medium which can be used to store information in a non-transitory way and which can be accessed within the computing system 4300. The storage 4340 stores instructions for the software 280 implementing one or more innovations described herein.

The input device(s) 4350 can be an input device such as a keyboard, mouse, pen, or trackball, a voice input device, a scanning device, touch device (e.g., touchpad, display, or the like) or another device that provides input to the computing system 4300. The output device(s) 4360 can be a display, printer, speaker, CD-writer, or another device that provides output from the computing system 4300.

The communication connection(s) 4370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 20—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 21—Example Cloud Computing Environment

Figure 44:
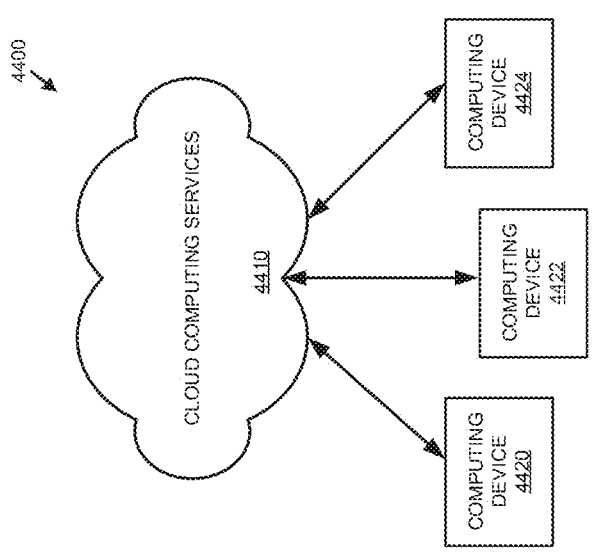
FIG. 44 is a block diagram of an example cloud computing environment that can be used in conjunction with the technologies described herein.

FIG. 44 depicts an example cloud computing environment 4400 in which the described technologies can be implemented, including, e.g., the system disclosed above and other systems herein. The cloud computing environment 4400 comprises cloud computing services 4410. The cloud computing services 4410 can comprise various types of cloud computing resources, such as computer servers, data storage repositories, networking resources, etc. The cloud computing services 4410 can be centrally located (e.g., provided by a data center of a business or organization) or distributed (e.g., provided by various computing resources located at different locations, such as different data centers and/or located in different cities or countries).

The cloud computing services 4410 are utilized by various types of computing devices (e.g., client computing devices), such as computing devices 4420, 4422, and 4423. For example, the computing devices (e.g., 4420, 4422, and 4424) can be computers (e.g., desktop or laptop computers), mobile devices (e.g., tablet computers or smart phones), or other types of computing devices. For example, the computing devices (e.g., 4420, 4422, and 4424) can utilize the cloud computing services 4410 to perform computing operations (e.g., data processing, data storage, and the like).

In practice, cloud-based, on-premises-based, or hybrid scenarios can be supported.

Example 22—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 23—Example Path Tree Alternatives

In the example embodiments described above, a path tree corresponding to a database table is constructed from row-value-paths associated with the values in the database table. In alternative embodiments, the path tree corresponding to the database table can be constructed from column-value-paths associated with the values in the database table. For example, a database table T containing M rows and N columns of values can be transposed into a transposed database table T' containing N rows and M columns of the same values (i.e., a cell located at the i-th row and j-th column in T is transposed to a cell located at the j-th row and i-th column in T'). Thus, the row-value-paths of T' are identical to corresponding column-value-paths of T. Similarly, the row-value-paths of T are identical to corresponding column-value-paths of T'. Therefore, the path tree can be obtained from either T or T', and the same principles described above can be used for reconstruction of database table based on such path tree and the statistical artefacts derived from the path tree.

Example 24—Example Application to Other Database Types

As noted above, the same principles disclosed herein can also be applied to other types of databases such as graph databases or other database types, while the detailed implementation scheme may vary depending on the specific type of databases.

For example, the triple-store model, also known as resource description framework (RDF), is one type of graph model comprising nodes are arcs. An RDF graph notation or a statement can be represented by a node for the subject that denotes the resource, a node for the object, and an arc or edge for the predicate. The predicate can specify traits or aspects of the resource and indicates a relationship type between the subject and the object. Thus, an RDF model can make statements about resources (e.g., web resources) in expressions of the form subject-predicate-object, also known as triples. The technologies described herein can be used to generate realistic mock data based on original data stored in an RDF model. In practice, the arc/edge in an RDF model can be regarded as a column and a node type can be regarded as a table. Object property edges can be interpreted as foreign key columns. For example, when the RDF model contains an edge type "married to" and a node type "person", relevant statistical artefacts can be calculated in the same way as described above for relational databases.

Example 25—Example Embodiments

Any of the following embodiments can be implemented.

Clause 1. A computer-implemented method comprising:
receiving statistical artefacts representing an original database table, the original database table comprising original values arranged in a plurality of rows and a plurality of columns; and
instantiating a reconstructed database table based on the statistical artefacts, the reconstructed database table comprising reconstructed values arranged in at least a subset of the plurality of columns of the original database table;
wherein the statistical artefacts comprise first metrics characterizing distributions of row-based sequences of the original values and second metrics characterizing distributions of the first metrics;
wherein distributions of row-based sequences of the reconstructed values in the reconstructed database table are consistent with the first metrics, and meta-distributions of row-based sequences of the reconstructed values in the reconstructed database table are consistent with the second metrics.

Clause 2. The method of Clause 1, wherein at least some of the reconstructed values in the reconstructed database table are different from the corresponding original values in the original database table.

Clause 3. The method of any one of Clauses 1-2, wherein:
the original database table comprises a first original database table that is related to at least a second original database table by a foreign key;
the reconstructed database table is a first reconstructed database table;
a second reconstructed database table is reconstructed based on statistical artefacts representing the second original database table; and
a foreign key relationship between the first original database table and the second original database table is preserved in the first reconstructed database table and the second reconstructed database table.

Clause 4. The method of any of Clauses 1-3, wherein the statistical artefacts are calculated from a path tree constructed from row-value-paths associated with the original values in the original database table;
wherein the path tree comprises a root and path-mark-nodes connected by edges, the path-mark-nodes being arranged in a plurality of layers corresponding to the plurality of columns in the original database table;
wherein a path-mark-node in a layer defines a distinct row-value-path traversing from the root to the path-mark-node; and wherein an edge connecting two path-mark-nodes comprises a path-count representing a count of row-value-paths traversing the two path-mark-nodes.

Clause 5. The method of Clause 4, wherein the first metrics comprise distinct path-count-sequences corresponding to the path-mark-nodes, wherein a distinct path-count-sequence comprises a unique sequence of path-counts of edges traversing from the root to the corresponding path-mark-node.

Clause 6. The method of any of Clauses 4-5, wherein the second metrics comprise counts for distinct path-count-sequences.

Clause 7. The method of any of Clauses 4-6, wherein the statistical artefacts further comprise distinct-value-counts of the original database table, wherein a distinct-value-count represents a count of distinct original values in a corresponding column of the original database table.

Clause 8. The method of Clause 7, wherein instantiating the reconstructed database table comprises generating distinct fitting values for the reconstructed database table, wherein counts of distinct fitting values for the plurality of columns of the reconstructed database table equal the corresponding distinct-value-counts of the original database table.

Clause 9. The method of Clause 8, wherein the original database table is a first original database table and is related to at least a second original database table by a first foreign key;

wherein the reconstructed database table is a first reconstructed database table and is related to at least a second reconstructed database table by a second foreign key corresponding to the first foreign key; and wherein the method further comprises instantiating the second reconstructed database table based on statistical artefacts associated with the second original database table.

Clause 10. The method of Clause 9, wherein the distinct fitting values associated with the foreign key generated for the first reconstructed database table define a first distinct value set;

wherein instantiating the second reconstructed database comprises generating distinct fitting values for the second reconstructed database table, wherein the distinct fitting values associated with the foreign key generated for the second reconstructed database define a second distinct value set; and wherein the first distinct value set is a subset of the second distinct value set if the second distinct value set has more members than the first distinct value set, and the second distinct value set is a subset of the first distinct value set if the first distinct value set has more members than the second distinct value set.

Clause 11. The method of any of Clauses 8-10, wherein instantiating the reconstructed database table comprises initiating empty cells arranged by the plurality of rows and the plurality of columns, and assigning the distinct fitting values to the empty cells.

Clause 12. The method of Clause 11, wherein assigning the distinct fitting values to the empty cells comprises identifying fitting rows, wherein identifying fitting rows comprises randomly selecting rows of the reconstructed database table based on the distinct path-count-sequences.

Clause 13. The method of Clause 12, wherein identifying fitting rows further comprises comparing counts of empty cells in a column corresponding to the distinct path-count-sequences to the distinct-value-counts corresponding to the column.

Clause 14. The method of any of Clauses 12-13, wherein assigning the distinct fitting values to the empty cells comprises randomly selecting the distinct fitting values corresponding to the fitting rows based on past record of assigning the distinct fitting values.

Clause 15. A system comprising:

a first computer containing an original database table comprising original values arranged in a plurality of rows and a plurality of columns, wherein the first computer is configured to create statistical artefacts associated with the original database table; and a second computer configured to receive the statistical artefacts from the first computer and instantiate a reconstructed database table based on the statistical artefacts, the reconstructed database table comprising reconstructed values arranged in a subset of the plurality of columns of the original database table;

wherein at least some of the reconstructed values in the reconstructed database table are different from the corresponding original values in the original database table; and wherein the original database table is associated with a first path tree, the reconstructed database table is associated with a second path tree, the first path tree and the second path tree sharing an identical tree topology.

Clause 16. The system of Clause 15, wherein the first and second path trees associated with the original and reconstructed database tables respectively define row-value-paths associated with the original and reconstructed values in the original and reconstructed database tables;

wherein the first and second path trees comprise respective root and path-mark-nodes connected by edges, the path-mark-nodes being arranged in a plurality of layers corresponding to the plurality of columns;

wherein a path-mark-node in a layer defines a distinct row-value-path traversing from the respective root to the path-mark-node; and wherein an edge connecting two path-mark-nodes comprises a path-count representing a count of row-value-paths traversing the two path-mark-nodes.

Clause 17. The system of any of Clause 15-16, wherein the statistical artefacts comprise distinct path-count-sequences corresponding to the path-mark-nodes and counts for distinct path-count-sequences, wherein a distinct path-count-sequence comprises a unique sequence of path-counts of edges traversing from the respective root to the corresponding path-mark-node.

Clause 18. The system of Clause 17, wherein the statistical artefacts further comprise distinct-value-counts of the original database table, wherein a distinct-value-count represents a count of distinct original values in a corresponding column of the original database table.

Clause 19. The system of any of Clauses 15-18, wherein the original database table is a first original database table and is related to at least a second original database table by a first foreign key;

wherein the reconstructed database table is a first reconstructed database table and is related to at least a second reconstructed database table by a second foreign key corresponding to the first foreign key; and wherein the second computer is further configured to instantiate the second reconstructed database table based on statistical artefacts associated with the second original database table.

Clause 20. One or more computer-readable media having encoded thereon computer-executable instructions causing one or more processors to perform a method comprising:

generating statistical artefacts associated with an original database table, the original database table comprising original values arranged in a plurality of rows and a plurality of columns; and instantiating a reconstructed database table based on the statistical artefacts, the reconstructed database table comprising reconstructed values arranged in at least a subset of the plurality of columns of the original database table;

wherein at least some of the reconstructed values in the reconstructed database table are different from the corresponding original values in the original database table;

wherein the original database table is associated with a first path tree, the reconstructed database table is associated with a second path tree, the first path tree and the second path tree sharing an identical tree topology;

wherein the first and second path trees associated the original and reconstructed database tables respectively define row-value-paths associated with the original and reconstructed values in the original and reconstructed database tables;

wherein the first and second path trees comprise respective root and path-mark-nodes connected by edges, the path-mark-nodes being arranged in a plurality of layers corresponding to the plurality of columns;

wherein a path-mark-node in a layer defines a distinct row-value-path traversing from the respective root to the path-mark-node; and wherein an edge connecting two path-mark-nodes comprises a path-count representing a count of row-value-paths traversing the two path-mark-nodes.

Example 26—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
determining statistical artefacts representing an original database table, the original database table comprising original values arranged in a plurality of rows and a plurality of columns; and
instantiating a reconstructed database table based on the statistical artefacts, the reconstructed database table comprising reconstructed values arranged in at least a subset of the plurality of columns of the original database table;
wherein the statistical artefacts comprise first metrics characterizing distributions of row-based sequences of the original values and second metrics characterizing distributions of the first metrics;
wherein the determining statistical artefacts comprises generating a path tree from row-value-paths associated with the original values in the original database table, wherein the generating the path tree comprises arranging path-mark-nodes in a plurality of layers corresponding to the plurality of columns and connecting a root and the path-mark-nodes by edges.

2. The method of claim 1, wherein at least some of the reconstructed values in the reconstructed database table are different from the corresponding original values in the original database table.

3. The method of claim 1, wherein:
the original database table comprises a first original database table that is related to at least a second original database table by a foreign key;
the reconstructed database table is a first reconstructed database table;
a second reconstructed database table is reconstructed based on statistical artefacts representing the second original database table; and
a foreign key relationship between the first original database table and the second original database table is preserved in the first reconstructed database table and the second reconstructed database table.

4. The method of claim 1,
wherein a path-mark-node in a layer defines a distinct row-value-path traversing from the root to the path-mark-node; and
wherein an edge connecting two path-mark-nodes comprises a path-count representing a count of row-value-paths traversing the two path-mark-nodes.

5. The method of claim 4, wherein the first metrics comprise distinct path-count-sequences corresponding to the path-mark-nodes, wherein a distinct path-count-sequence comprises a unique sequence of path-counts of edges traversing from the root to the corresponding path-mark-node.

6. The method of claim 5, wherein the second metrics comprise counts for distinct path-count-sequences.

7. The method of claim 6, wherein the statistical artefacts further comprise distinct-value-counts of the original database table, wherein a distinct-value-count represents a count of distinct original values in a corresponding column of the original database table.

8. The method of claim 7, wherein instantiating the reconstructed database table comprises generating distinct fitting values for the reconstructed database table, wherein counts of distinct fitting values for the plurality of columns of the reconstructed database table equal the corresponding distinct-value-counts of the original database table.

9. The method of claim 8, wherein the original database table is a first original database table and is related to at least a second original database table by a first foreign key;
wherein the reconstructed database table is a first reconstructed database table and is related to at least a second reconstructed database table by a second foreign key corresponding to the first foreign key; and
wherein the method further comprises instantiating the second reconstructed database table based on statistical artefacts associated with the second original database table.

10. The method of claim 9, wherein the distinct fitting values associated with the foreign key generated for the first reconstructed database table define a first distinct value set;
wherein instantiating the second reconstructed database comprises generating distinct fitting values for the second reconstructed database table, wherein the distinct fitting values associated with the foreign key generated for the second reconstructed database define a second distinct value set; and
wherein the first distinct value set is a subset of the second distinct value set if the second distinct value set has more members than the first distinct value set, and the second distinct value set is a subset of the first distinct value set if the first distinct value set has more members than the second distinct value set.

11. The method of claim 8, wherein instantiating the reconstructed database table comprises initiating empty cells arranged by the plurality of rows and the plurality of columns, and assigning the distinct fitting values to the empty cells.

12. The method of claim 11, wherein assigning the distinct fitting values to the empty cells comprises identifying fitting rows, wherein identifying fitting rows comprises randomly selecting rows of the reconstructed database table based on the distinct path-count-sequences.

13. The method of claim 12, wherein identifying fitting rows further comprises comparing counts of empty cells in a column corresponding to the distinct path-count-sequences to the distinct-value-counts corresponding to the column.

14. The method of claim 12, wherein assigning the distinct fitting values to the empty cells comprises randomly selecting the distinct fitting values corresponding to the fitting rows based on past record of assigning the distinct fitting values.

15. A system comprising:
a first computer containing an original database table comprising original values arranged in a plurality of rows and a plurality of columns, wherein the first computer is configured to create statistical artefacts associated with the original database table; and
a second computer configured to receive the statistical artefacts from the first computer and instantiate a reconstructed database table based on the statistical artefacts, the reconstructed database table comprising reconstructed values arranged in a subset of the plurality of columns of the original database table;
wherein at least some of the reconstructed values in the reconstructed database table are different from the corresponding original values in the original database table;
wherein the creating statistical artefacts by the first computer comprises determining a first path tree defining row-value-paths associated with the original values in the original database table, wherein the act of instantiating the reconstructed database table by the second computer comprises determining a second path tree defining row-value-paths associated with the reconstructed values in the reconstructed database table, the first path tree and the second path tree sharing an identical tree topology,
wherein the determining the first path tree and the second path tree comprises arranging respective path-mark-nodes in a plurality of layers corresponding to the plurality of columns and connecting respective roots and the path-mark-nodes by edges.

16. The system of claim 15,
wherein a path-mark-node in a layer defines a distinct row-value-path traversing from the respective root to the path-mark-node; and
wherein an edge connecting two path-mark-nodes comprises a path-count representing a count of row-value-paths traversing the two path-mark-nodes.

17. The system of claim 16, wherein the statistical artefacts comprise distinct path-count-sequences corresponding to the path-mark-nodes and counts for distinct path-count-sequences, wherein a distinct path-count-sequence comprises a unique sequence of path-counts of edges traversing from the respective root to the corresponding path-mark-node.

18. The system of claim 17, wherein the statistical artefacts further comprise distinct-value-counts of the original database table, wherein a distinct-value-count represents a count of distinct original values in a corresponding column of the original database table.

19. The system of claim 15, wherein the original database table is a first original database table and is related to at least a second original database table by a first foreign key;
wherein the reconstructed database table is a first reconstructed database table and is related to at least a second reconstructed database table by a second foreign key corresponding to the first foreign key; and
wherein the second computer is further configured to instantiate the second reconstructed database table based on statistical artefacts associated with the second original database table.

20. One or more non-transitory computer-readable media having encoded thereon computer-executable instructions causing one or more processors to perform a method comprising:
generating statistical artefacts associated with an original database table, the original database table comprising original values arranged in a plurality of rows and a plurality of columns; and
instantiating a reconstructed database table based on the statistical artefacts, the reconstructed database table comprising reconstructed values arranged in at least a subset of the plurality of columns of the original database table;
wherein at least some of the reconstructed values in the reconstructed database table are different from the corresponding original values in the original database table;
wherein the original database table is associated with a first path tree, the reconstructed database table is associated with a second path tree, the first path tree and the second path tree sharing an identical tree topology;
wherein the first and second path trees associated the original and reconstructed database tables respectively define row-value-paths associated with the original and reconstructed values in the original and reconstructed database tables;
wherein the first and second path trees comprise respective root and path-mark-nodes connected by edges, the path-mark-nodes being arranged in a plurality of layers corresponding to the plurality of columns;
wherein a path-mark-node in a layer defines a distinct row-value-path traversing from the respective root to the path-mark-node; and
wherein an edge connecting two path-mark-nodes comprises a path-count representing a count of row-value-paths traversing the two path-mark-nodes.

* * * * *